(12) United States Patent
Battlogg

(10) Patent No.: US 12,320,397 B2
(45) Date of Patent: *Jun. 3, 2025

(54) MAGNETORHEOLOGICAL BRAKING DEVICE, IN PARTICULAR OPERATING APPARATUS

(71) Applicant: INVENTUS Engineering GmbH, St. Anton i.M. (AT)

(72) Inventor: Stefan Battlogg, St. Anton i.M. (AT)

(73) Assignee: INVENTUS Engineering GmbH, St. Anton i.M. (AT)

( * ) Notice: Subject to any disclaimer, the term of this patent is extended or adjusted under 35 U.S.C. 154(b) by 505 days.

This patent is subject to a terminal disclaimer.

(21) Appl. No.: 17/784,146

(22) PCT Filed: Nov. 18, 2020

(86) PCT No.: PCT/EP2020/087161
§ 371 (c)(1),
(2) Date: Jun. 10, 2022

(87) PCT Pub. No.: WO2021/123261
PCT Pub. Date: Jun. 24, 2021

(65) Prior Publication Data
US 2023/0036212 A1   Feb. 2, 2023

(30) Foreign Application Priority Data

Dec. 18, 2019   (DE) .................. 10 2019 135 030.1

(51) Int. Cl.
*F16D 57/00*   (2006.01)
*G01B 7/30*   (2006.01)
*G01D 5/14*   (2006.01)

(52) U.S. Cl.
CPC ............. *F16D 57/002* (2013.01); *G01B 7/30* (2013.01); *G01D 5/145* (2013.01)

(58) Field of Classification Search
CPC .......... F16D 9/535; F16D 9/12; F16D 9/3292; F16D 57/002; G01B 7/30; G01D 5/145
See application file for complete search history.

(56) References Cited

U.S. PATENT DOCUMENTS

| 8,887,580 B2 | 11/2014 | Nishikawa et al. |
| 10,067,015 B2 | 9/2018 | Lee et al. |
| (Continued) | | |

FOREIGN PATENT DOCUMENTS

| CN | 103287492 A | * | 9/2013 | ............... B62D 6/10 |
| CN | 105094055 A |   | 11/2015 | |
| (Continued) | | | | |

*Primary Examiner* — Vishal R Sahni
(74) *Attorney, Agent, or Firm* — Laurence A. Greenberg; Werner H. Stemer; Ralph E. Locher

(57) ABSTRACT

A magnetorheological braking device for setting operating states by way of rotational movements has an axle unit and a rotary body rotatable about the axle unit. The rotatability of the rotary body can be decelerated and/or blocked by a magnetorheological braking apparatus. A sensor apparatus has a magnetic ring unit and a magnetic field sensor for sensing a magnetic field of the magnetic ring unit. A shielding apparatus at least partially shields the sensor apparatus from a magnetic field of a coil unit of the braking apparatus. The shielding apparatus includes a shielding body surrounding the magnetic ring unit and a separating unit between the shielding body and the magnetic ring unit, and having a magnetic conductivity multiple times lower than the shielding body. A holding apparatus connects the shielding apparatus to the rotary body in an at least partially rotationally fixed manner.

26 Claims, 9 Drawing Sheets

(56) References Cited

U.S. PATENT DOCUMENTS

| | | | | |
|---|---|---|---|---|
| 2002/0057152 A1* | 5/2002 | Elferich | ................ | B60K 35/10 |
| | | | | 335/220 |
| 2010/0231069 A1 | 9/2010 | Liao et al. | | |
| 2012/0260763 A1 | 10/2012 | Terao et al. | | |
| 2013/0220030 A1* | 8/2013 | Nishikawa | .............. | G01L 3/101 |
| | | | | 73/862.331 |
| 2016/0153508 A1* | 6/2016 | Battlogg | .................. | A61F 2/38 |
| | | | | 188/267.2 |
| 2020/0355229 A1 | 11/2020 | Battlogg | | |
| 2022/0412416 A1* | 12/2022 | Battlogg | .................. | F16F 9/12 |

FOREIGN PATENT DOCUMENTS

| | | | | | |
|---|---|---|---|---|---|
| CN | 106605133 | A | | 4/2017 | |
| CN | 106843367 | A | | 6/2017 | |
| CN | 107735748 | A | | 2/2018 | |
| DE | 102018100390 | A1 | | 7/2019 | |
| EP | 1168622 | A2 | * | 1/2002 | ............ B60K 37/06 |
| EP | 2479453 | A2 | * | 7/2012 | .............. F16F 9/182 |
| EP | 3382495 | A1 | | 10/2018 | |
| JP | 2006213080 | A | | 8/2006 | |
| WO | 2017001697 | A1 | | 1/2017 | |

\* cited by examiner

MAGNETORHEOLOGICAL BRAKING DEVICE, IN PARTICULAR OPERATING APPARATUS

FIELD AND BACKGROUND OF THE INVENTION

The present invention relates to a magnetorheological braking device for braking or decelerating rotating movements and in particular to a magnetorheological operating apparatus for adjusting operating states at least by means of rotating movements. The braking device has at least one axle unit and at least one rotating member which is rotatable about the axle unit. The rotatability of the rotating member is able to be braked in a targeted manner by means of at least one magnetorheological braking device.

Such braking devices enable rotating movements to be decelerated and even blocked in a particularly targeted manner. In some instances, the braking devices are configured as operating apparatuses. Such operating apparatuses are used increasingly in the most various apparatuses and, for example, in motor vehicles (for example operating element in the center console, in the steering wheel, on the seat . . . ), in the medical field (for example for adjusting the medical apparatuses) or in smart devices (for example smartphone, smart watch, computer accessories, computer mouse, game controller, joystick), off-road vehicles (for example operating elements in agricultural machinery), boats/ships, aircraft, to select menus, for example, or else to be able to perform precise control movements. For example, different moments, detents and ripple actions for the rotating movement can be adjusted by means of the magnetorheological braking apparatus. In this way, a particular tactility (haptic feedback) can be achieved when adjusting operating states, this assisting the user and permitting very targeted adjustments and thus reducing the operating complexity.

In order to be able to actuate the magnetorheological braking apparatus in a targeted manner, a sensor apparatus for identifying and for monitoring the rotary position is typically provided. However, the structural accommodation of said sensor apparatus in the braking device is associated with significant difficulties, in particular when the available installation space is very small.

The sensor apparatus (for example, the spacing of the magnetic ring from the sensor) thus typically has to be disposed in relation to the components to be monitored within a very narrow tolerance bandwidth. For example, variations in the spacings of such components lead to a deterioration of the measurement signal and to interfering noise. This is a great disadvantage in particular in the case of fine ripple actions, a reversal of the rotation direction with a detent or a blockage in one rotation direction (clockwise or counter-clockwise; freewheeling in one direction) and in the case of precise adjustment options (for example a sensor with 90,112 increments per revolution). Haptic actuators such as, for example, rotating/push-button actuators set high requirements in terms of the precision of the adjustment, because said haptic actuators in most cases are activated by the very sensitive fingers. Minute angular errors or variances in moments have a poor haptic experience, in particular in the case of electronically generated detents with a reversal of the rotation direction. Moreover, many interfaces having a long tolerance chain and thus a high overall tolerance result by virtue of the, in most instances numerous, affected components.

Further issues result on account of the dimensions of the braking device, which in most instances are only very minor. In this way, for a braking device configured as a thumb wheel, for example, there is often only 12 mm available in terms of the diameter, such as in, for example, a wheel (roller) rotatable with a finger (for example the thumb) in a steering wheel, or in a steering wheel spoke (for example for adjusting the volume of the infotainment system), for example of a motor vehicle. The installation space for the sensor apparatus is thus very limited. Overall, this results in a demand for optimization in terms of assembly, costs and installation space.

In most instances, the influence on the sensor signals by the magnetic field generated during the operation by the braking apparatus is also particularly problematic. External stray fields also often represent interfering influences. In this way, there is also a considerable demand in terms of improvement in the case of shielding the sensor apparatus from such influences.

SUMMARY OF THE INVENTION

Against this background, it is the object of the present invention to provide an improved braking device. The shielding of the sensor apparatus from interferences is preferably to be improved. In particular, the structural accommodation (installation space requirement, disposal of the components, overall tolerance of the components . . . ) of the sensor apparatus is to be improved. A reliable and ideally precise detection by the sensors, and at the same time an integration in the magnetorheological braking device that saves installation space, is preferably to be made possible.

This object is achieved by a braking device as claimed. Preferred refinements of the invention are the subject matter of the dependent claims. Further advantages and features of the present invention are derived from the general description and from the description of the exemplary embodiments.

The braking device according to the invention is of a magnetorheological configuration and serves for adjusting operating states at least by means of rotating movements. The braking device comprises at least one axle unit. The braking device comprises at least one rotating member. The rotating member is rotatable about the axle unit. A rotatability of the rotating member (relative to the axle unit) is able to be braked in a targeted manner by means of at least one magnetorheological braking apparatus. The braking device comprises at least one sensor apparatus for detecting a rotary position of the rotating member, in particular in relation to the axle unit. The sensor apparatus comprises at least one magnetic ring unit and at least one magnetic field sensor for detecting a magnetic field of the magnetic ring unit. The magnetorheological braking device here comprises at least one shielding apparatus for at least partially shielding the sensor apparatus at least from a magnetic field of a coil unit of the braking apparatus and/or in particular from external magnetic fields. The shielding apparatus here comprises at least one shielding member which at least in portions surrounds the magnetic ring unit. The shielding apparatus comprises in particular at least one separation unit that is disposed between the shielding member and the magnetic ring unit. The separation unit has a magnetic conductivity which is less by a multiple than the shielding member. Comprised here is at least one mounting apparatus which at least partially connects the shielding apparatus, in particular in a rotationally fixed manner, to the rotating member.

The braking device according to the invention offers many advantages. The shielding apparatus and also the mounting apparatus offer a considerable advantage. As a result, the sensor apparatus can be shielded in a particularly effective manner, and at the same time with little complexity and in a space-saving manner, from interfering influences. The invention therefore offers a considerably improved detection of the rotary position.

The shielding apparatus comprises in particular at least one magnetic decoupling apparatus that is disposed between the shielding member and the rotating member. The separation unit and/or the coupling apparatus here preferably have/has a magnetic conductivity (magnetic permeability) which is less by a multiple than the shielding member.

The decoupling apparatus is in particular at least in part provided by the mounting apparatus. The decoupling apparatus can be completely provided by the mounting apparatus. In this instance, the mounting apparatus corresponds in particular to the decoupling apparatus. In this instance, the terms mounting apparatus and coupling apparatus can in particular be used as synonyms and are, therefore, interchangeable. The mounting apparatus can comprise the decoupling apparatus or be configured as the latter. The decoupling apparatus and the mounting apparatus can also be at least in part separately configured. The decoupling apparatus and the mounting apparatus can be separate components.

It is possible and advantageous for the mounting apparatus to be configured in at least two parts. In this instance, the mounting apparatus comprises in particular at least a first mounting component which is configured so as to be magnetically conductive. In this instance, the mounting apparatus comprises in particular at least a second mounting component which is configured so as to be magnetically non-conductive. The second mounting component preferably has a magnetic conductivity (magnetic permeability) which is less by a multiple than the shielding member. The second mounting component comprises in particular the decoupling apparatus, or is configured as the latter. The mounting apparatus can at least in part be configured so as to be magnetically conductive. The mounting apparatus can at least in part be configured so as to be magnetically non-conductive.

It is provided in particular that the mounting apparatus at least partially connects the shielding member and/or the separation unit and/or the magnetic ring unit and/or the decoupling apparatus, in particular in a rotationally fixed manner, to the rotating member.

In the context of the present invention, braking or decelerating is in particular understood to be an impingement with a moment (torque). Herein, a (rotating) movement can be decelerated by the moment, and in particular also be blocked. As a result of the moment, a rotatability can preferably also be braked and in particular blocked from a stoppage. In the context of the present invention the terms braking and decelerating are in particular used as synonyms and are, therefore, interchangeable.

It is possible and advantageous for the rotating member and/or the shielding member and/or the decoupling apparatus to be at least partially integrally connected to the mounting apparatus. The rotating member and/or the shielding member and/or the decoupling apparatus can also be configured separately from the mounting apparatus. The separation unit is in particular configured separately from the mounting apparatus.

It is also possible and advantageous for the rotating member and/or the shielding member and/or the separation unit and/or the decoupling apparatus to be at least in part assembled on the mounting apparatus. In this instance, the separate components can be assembled on the mounting apparatus in particular and/or on one another.

The mounting apparatus can have at least one fastening apparatus which is configured for fastening at least one additional part, in particular an additional part of a finger wheel. The additional part is in particular the additional part described in more detail hereunder.

In one refinement, the mounting apparatus comprises at least one (in particular magnetically conductive) distance which extends between the rotating member and the shielding member. The distance corresponds to at least one quarter and preferably at least half of a maximum (in particular external) diameter of an electric coil of the coil unit (in particular in a radial direction within the coil plane). As a result, the decoupling apparatus can be dispensed with in specific applications without any undesirable influence on the magnetic field sensor arising. Depending on the geometry of the mounting apparatus, a field strength of a magnetic field, which prevails in the rotating member as a result of the operation, can be reduced for example by half or more along the distance up to the shielding member. The distance runs in particular across a part of the mounting apparatus that is configured in the manner of a sleeve and comprises a central radial clearance.

In one preferred design embodiment it is provided that the braking device is configured so as to be magnetorheological and serves for adjusting operating states at least by means of rotating movements. The braking device comprises at least one axle unit. The braking device comprises at least one rotating member. The rotating member is rotatable about the axle unit. A rotatability of the rotating member (relative to the axle unit) is able to be braked in a targeted manner by means of at least one magnetorheological braking apparatus. The braking device comprises at least one sensor apparatus for detecting a rotary position of the rotating member, in particular in relation to the axle unit. The sensor apparatus comprises at least one magnetic ring unit and at least one magnetic field sensor for detecting a magnetic field of the magnetic ring unit. The magnetorheological braking device here comprises at least one shielding apparatus for at least partially shielding the sensor apparatus at least from a magnetic field of a coil unit of the braking apparatus and/or in particular from external magnetic fields. The shielding apparatus here comprises at least one shielding member which at least in portions surrounds the magnetic ring unit. The shielding apparatus comprises in particular at least one separation unit that is disposed between the shielding member and the magnetic ring unit. The shielding apparatus comprises at least one magnetic decoupling apparatus that is disposed between the shielding member and the rotating member. The separation unit and/or the decoupling apparatus here have/has a magnetic conductivity (magnetic permeability) that is less by a multiple than the shielding member.

The shielding apparatus is in particular suitable and configured to shield a magnetic field of the braking apparatus, in particular of the coil unit, in such a manner that said magnetic field does not stray into the sensor apparatus and unfavorably influences the detection of the magnetic field of the magnetic ring unit.

The shielding member is in particular not disposed between the magnetic field sensor and the magnetic ring unit. The shielding member is in particular disposed between the magnetic field sensor and the magnetic ring unit in such a manner that the shielding member does not (undesirably) shield the magnetic field sensor in relation to the magnetic field to be detected of the magnetic ring unit.

In one advantageous design embodiment, the shielding member at least in portions surrounds the magnetic ring unit at least on a radial external side. It is also preferable and advantageous for the shielding member at least in portions to surround the magnetic ring unit at least on at least one axial side that faces the coil unit of the braking apparatus. The shielding member extends in particular at least along an axial internal side of the magnetic ring unit.

The shielding member is in particular configured as a shielding ring. The shielding ring has in particular an L-shaped cross section. The shielding ring can also have a U-shaped cross section. The shielding member can also be configured as a cylindrical ring. Other suitable geometries which at least in part extend about the magnetic ring unit are also possible. The shielding ring can be integrally configured. An embodiment in multiple parts is also possible. The magnetic ring unit here is in particular in part disposed radially within the shielding ring. This offers a compact disposal and effective shielding.

In one preferred and advantageous design embodiment the separation unit comprises at least one gap which runs between the shielding member and the magnetic ring unit. The separation unit also comprises in particular at least one filler medium which is disposed in the gap. The filler medium is in particular a casting compound for retrospectively filling the gap. At least one plastics material is in particular provided as the filler medium. The filler medium is in particular suitable and configured to fixedly connect the shielding member to the magnetic ring unit. It is also preferable and advantageous that air is provided as the filler medium.

In all design embodiments it is preferable for the magnetic ring unit to be connected in a rotationally fixed manner to the rotating member. Should air be provided as the filler medium, at least one connection element and, for example a disk on the end side, or the like, can be provided for connecting the magnetic ring unit in a rotationally fixed manner to the rotating member. The connection element here, in terms of the magnetic permeability thereof, preferably has the magnetic properties which have been described in the context of the separation unit.

The filler medium is in particular suitable and configured to connect the magnetic ring unit to the shielding member mechanically and preferably in a rotationally fixed manner. This enables a particularly compact construction mode because fastening and shielding are achieved at the same time. The filler medium and the magnetic ring unit are in particular mounted so as to be rotatable in relation to the axle unit.

In particular, the magnetic ring unit by means of the separation unit and/or of the shielding member is connected in a rotationally fixed manner to the mounting apparatus and in particular to the decoupling apparatus. The mounting apparatus here, in particular the decoupling apparatus, is preferably at least indirectly connected in a rotationally fixed manner to the rotating member. In this way, the rotating movement of the rotating member can be transmitted to the magnetic ring unit in a space-saving and reliable manner by way of the shielding apparatus. The rotating member can be radially surrounded by at least one additional part. The mounting apparatus, in particular the decoupling apparatus, here can be connected in a rotationally fixed manner to the rotating member by way of the additional part. The mounting apparatus, in particular the decoupling apparatus, can also be directly connected in a rotationally fixed manner to the rotating member. In particular, the magnetic ring unit and the separation unit and the shielding member and the decoupling apparatus are mounted so as to be rotatable in relation to the axle unit. In particular, the mounting apparatus is mounted so as to be rotatable in relation to the axle unit.

In one particularly advantageous design embodiment the mounting apparatus, in particular the decoupling apparatus, comprises at least one decoupling sleeve, or is configured as the latter. In particular, the decoupling sleeve radially surrounds at least the axle unit. In particular, the decoupling sleeve at least in portions is disposed so as to be axially adjacent to the rotating member. This offers a considerable improvement in terms of the magnetic decoupling. It is possible for the decoupling sleeve in the axial direction to be disposed so as to overlap the rotating member and/or the additional part. The decoupling sleeve can at least in part be provided by the mounting apparatus.

The decoupling sleeve by at least one decoupling gap is preferably axially spaced apart from the rotating member. The decoupling apparatus comprises in particular the decoupling sleeve as well as the decoupling gap. At least one filler medium can be disposed in the decoupling gap. The filler medium is preferably configured as has been described above in the context of the separation unit. The gap provides in particular magnetic decoupling between the decoupling sleeve and the rotating member. However, it is also possible for the decoupling sleeve to bear in a contacting manner on the rotating member, or to be fastened to the latter.

The decoupling sleeve at least in portions, and in particular completely, can be configured as a separate component. It is also possible and advantageous for the decoupling sleeve at least in portions, in particular completely, to be provided by at least one additional part that radially surrounds the rotating member. The decoupling sleeve is in particular integrally connected to the additional part. For example, the additional part can extend so far in the axial direction that said additional part radially surrounds the magnetic ring unit.

At least one sealing apparatus is preferably fastened to the mounting apparatus, in particular to the decoupling apparatus, and particularly preferably to the decoupling sleeve. The sealing apparatus bears in particular in a sealing manner on the rotating member and/or on the additional part and/or on the axle unit. The sealing apparatus is in particular suitable and configured to counteract any leakage of a magnetorheological medium of the braking apparatus that is disposed in a receptacle space. As a result of such an integration of components, the braking device can be embodied so as to be even more compact.

The mounting apparatus, in particular the decoupling apparatus, and particularly preferably the decoupling sleeve, has in particular at least one axial wall. The axial wall extends in particular between the braking apparatus, in particular the coil unit thereof, and the magnetic ring unit. At least part of the sealing apparatus is in particular fastened to the axial wall. It is also possible and preferable for at least one bearing apparatus for the rotating movement of the rotating member in relation to the axle unit to be fastened to the axial wall. For example, the shielding apparatus and the components coupled thereto in a rotationally fixed manner are supported or mounted by the axial wall on the axle unit. The decoupling sleeve can also have at least one further axial wall which at the end side terminates an external end of the decoupling sleeve.

The decoupling sleeve is preferably made from plastics material. Other suitable materials, in particular having a minor magnetic conductivity, are also possible.

It is possible and preferable for the rotating member not to protrude beyond the last axial braking member by more than half an axial width of a braking member of the braking apparatus. The rotating member in particular protrudes in such a manner beyond that axial end that faces the magnetic ring unit. The rotating member does in particular not protrude beyond the last axial braking member on the axial end thereof. The rotating member can also be offset rearward in relation to the last axial braking member. Such design embodiments can advantageously also be provided on both axial ends, or at the end that lies opposite the magnetic ring unit. Shortening the rotating member in this manner is particularly advantageous in order to further reduce the stray effect of the magnetic field of the braking apparatus into the sensor apparatus.

In one particularly advantageous design embodiment the rotating member is radially surrounded by at least one additional part. The rotating member here is in particular axially offset rearward in relation to the additional part at least at that axial end of the axle unit on which the magnetic ring unit is disposed. In particular, the additional part protrudes beyond the rotating member at this axial end. The rotating member is preferably offset rearward in relation to the additional part at both axial ends. The axial length of the rotating member is in particular less than the axial length of the additional part. The magnetic decoupling is also furthermore considerably improved as a result.

In all design embodiments it is particularly preferable and advantageous for the shielding member to have a relative magnetic permeability of at least 1000, and preferably at least 10,000, and particularly preferably at least 100,000, or at least 500,000. The shielding member preferably has at least the relative magnetic permeability of the rotating member. The magnetic properties of the shielding member described here are preferably also provided for the rotating member.

The shielding member comprises in particular at least one ferromagnetic and/or at least one paramagnetic material, or is composed thereof. Such materials are preferably also provided for the rotating member.

In one particularly advantageous design embodiment the shielding member comprises at least one (in particular soft-magnetic) nickel/iron alloy with nickel/iron alloy with 60% to 90% nickel and proportions of copper, molybdenum, cobalt and/or chromium, or is composed thereof. A proportion of 69% to 82%, and preferably 72% to 80%, nickel can also be provided. Such a design embodiment is preferably also provided for the rotating member. The shielding member and/or the rotating member particularly preferably comprise/comprises at least one µ-metal, or are/is composed thereof.

It is advantageous and preferable for the decoupling apparatus (in particular the decoupling sleeve and/or the decoupling gap) and/or the separation unit (in particular the filler medium thereof) and/or at least the additional part to have a relative magnetic permeability of at most 1000, and preferably at most 100, and particularly preferably at most ten or at most two. It is also preferable and advantageous for the above-mentioned components to have a relative magnetic permeability of at most one thousandth of the relative magnetic permeability of the shielding member, and/or a relative magnetic permeability between 1 and 2. The above-mentioned components comprise in particular a paramagnetic material, or are composed thereof. It is also possible and preferable for the above-mentioned components to comprise a diamagnetic material, or to be composed thereof.

The above-described magnetic properties of the decoupling apparatus are preferably also provided for the axle unit. In this way, no interfering stray field at the magnetic field sensor is generated by the axle unit. For example, the axle unit is made from a plastics material, in particular a fiber-reinforced plastics material.

The coil unit of the braking apparatus can be disposed radially in relation to the axle unit. It is also possible for the coil unit to be disposed axially in relation to the axle unit. In such an axial disposal, the coil unit by way of the primary plane thereof extends in particular along a longitudinal axis of the axle unit.

The sensor apparatus comprises in particular at least one magnetic field sensor which is connected in a rotationally fixed manner to the axle unit. The magnetic field sensor is in particular disposed so as to be radially and/or axially adjacent to at least one magnetic ring unit. Such a design embodiment offers many advantages. The disposal of the magnetic field sensor offers a considerable advantage. As a result, a disposal which saves installation space and has a particularly short tolerance chain of the components (minor overall tolerance, or a few number of components between the fastening of the sensor and the fastening of the magnet), and at the same time a particularly reliable detection by sensors is enabled. The magnetic field sensor being connected to the axle unit here offers an integration particularly optimized in terms of tolerances.

The rotating member is preferably configured as a finger wheel, and particularly preferably as a thumb wheel. The rotating member is preferably configured as a cylindrical component which is set in rotation by means of at least one finger. The braking device is in particular provided for operation using only one finger. The braking device is in particular suitable and configured to be operated in a lying position. The rotation axis of the rotating member here assumes in particular a position which is more horizontal than vertical. It is however also possible for the braking device to be able to be operated upright (vertical alignment). The braking device here in most instances is in particular encompassed by two or a plurality of fingers. The rotating member can also be configured as a rotating button or the like, and in particular contain at least one push and/or pull function. For example, selected menus can be chosen or confirmed by this push/pull function.

The rotating member, or the finger wheel, has in particular a diameter of less than 50 mm, and preferably less than 20 mm, and particularly preferably less than 15 mm. For example, the rotating member has a diameter of at most 12 mm. Larger or smaller diameters for the rotating member are however also possible and advantageous for specific applications.

In all design embodiments it is possible and preferable for the rotating member to be equipped with at least one additional part. The additional part preferably surrounds the rotating member radially and preferably in the manner of a sleeve. The additional part can also close off the rotating member on at least one end side. To this end, the additional part is in particular configured as an additional sleeve which on at least one axial end side is at least partially and preferably completely closed. This relates in particular to that axial end side of the additional sleeve that is disposed on the end of the axle unit facing away from the magnetic ring unit. It can be provided here that the rotating member is configured as a hollow-cylindrical sleeve part configured so as to be open at the end sides.

The additional part is in particular configured as an additional sleeve that is pushed over the rotating member. The additional part here can have local enlargements of the external diameter. For example, the additional sleeve has an encircling elevation. The additional part serves in particular for enlarging the diameter of the rotating member.

The additional part can also be configured as a ring or the like, or comprise at least one such ring. The additional part for improving the tactility can be provided with at least one contour and can in particular be fluted and/or rubberized, or the like.

The magnetic ring unit is preferably disposed on an axial end side of the rotating member. This offers a particularly advantageous disposal of the magnetic ring unit. The magnetic ring unit can be fastened directly to the axial end side. However, it is also possible for the magnetic ring unit to be fastened to the axial end side of the rotating member by way of at least one connection element. It is also possible for the magnetic ring unit to be disposed on the axial end side of the rotating member and, by way of corresponding connection elements, to be fastened at another position of the braking device.

It is preferable and advantageous for the magnetic ring unit to at least in portions surround the magnetic field sensor in an annular manner. The magnetic ring unit is in particular disposed radially about the magnetic field sensor. The magnetic field sensor in the axial direction is in particular disposed so as to be centered in relation to the magnetic ring unit. This is understood to mean that the magnetic field sensor is disposed at the same axial longitudinal position as the magnetic ring unit. However, the magnetic field sensor in the axial direction can also be disposed so as to be offset from the magnetic ring unit. In the context of the present invention, such positional indications, and in particular the indications "radial" and "axial", relate in particular to a rotation axis of the rotating member.

It is also preferable and advantageous for the magnetic ring unit and the magnetic field sensor to be disposed so as to be mutually coaxial. This offers a disposal that particularly saves installation space, even in the case of particularly small dimensions and, for example, in the case of a thumb wheel. The magnetic field sensor here is in particular surrounded by the magnetic ring unit. The magnetic field sensor here is in particular centered axially and/or radially in relation to the magnetic ring unit. In particular, the magnetic field sensor has a targeted radial offset from the rotation axis of the magnetic ring unit. However, the magnetic field sensor at least in the axial direction can also be disposed so as to be offset from the magnetic ring unit.

It can be provided that the magnetic field sensor is disposed so as to be offset from the rotation axis of the magnetic ring unit. This can also be provided when an overall central disposal is provided for the magnetic field sensor, for example when the magnetic field sensor is disposed within the axle unit and in an annular manner is surrounded by the magnetic ring unit. Improved measuring of the rotation angles is possible as a result of the magnetic field sensor being offset in a targeted manner in relation to the rotation axis of the magnetic ring unit. In this way, each rotary position can be exactly defined even in the case of only two poles of the magnetic ring unit, for example, and each angle can thus be measured as exactly as possible. In this way, an absolute value transducer can be implemented in a manner which has particularly little complexity.

In one particularly preferred design embodiment the magnetic field sensor is disposed within the axle unit. This offers a particularly compact disposal of the magnetic field sensor, which at the same time is optimized in terms of tolerances. To this end, the axle unit has in particular at least one bore in which the magnetic field sensor is disposed. In the context of the present invention, a bore is in particular also understood to be all other suitable through openings, independently of whether or not the latter have been produced by means of a drilling method. The bore runs in particular in the longitudinal direction of the axle unit. The bore is in particular embodied so as to be continuous, or else can be configured as a blind bore.

The magnetic field sensor is in particular disposed so as to be centered in the axle unit. At least one active sensor portion of the magnetic field sensor is in particular disposed within the axle unit. The entire magnetic field sensor is preferably disposed within the axle unit. In the context of the present invention, the positional indications pertaining to the magnetic field sensor relate in particular to at least the active sensor portion.

The magnetic field sensor is preferably disposed in that bore of the axle unit through which at least one electrical connection of the braking apparatus also runs. The electrical connection here comprises in particular at least one supply line and/or control line for the coil unit. This offers an advantageous utilization of the installation space, and at the same time enables the sensor signals to be transmitted with particularly little complexity. The electrical connection exits the axle unit in particular at the end side.

The magnetic field sensor is in particular disposed on at least one circuit board. The circuit board is, for example, a printed circuit board, or comprises at least the latter. At least the braking apparatus, in particular the coil unit, is preferably also electrically connected to the circuit board. At least one connector line for contacting the braking device is preferably also connected to the circuit board. It is preferable and advantageous for the circuit board to be disposed within the axle unit. It is also preferable for the connector line to extend out of the axle unit.

The circuit board here is in particular disposed in the bore described above. The connector line runs in particular through the bore. The connector line exits the axle unit in particular at an end side. This offers rapid assembling with particularly little complexity, and at the same time offers a compact disposal of the corresponding components.

The connector line comprises in particular at least one plug unit. For example, a plug unit having six or eight pins is provided. In this way, the braking device can be connected in a particularly rapid and at the same time reliable manner to the component to be operated and to vehicle electronics, for example. The operating unit can also be fixed in the assembled position (for example the mounting of the operating part) by plugging in the plug.

The magnetic field sensor is preferably cast in the axle unit and/or insert-molded with at least one material. To this end, the bore is in particular at least partially filled with the material. Particularly preferably, the circuit board in the axle unit is insert-molded with at least one material. A plastics material or any other suitable material is preferably provided. In this way, the magnetic field sensor or the circuit board can be reliably protected in relation to external influences and at the same time be fastened with little complexity.

In one advantageous design embodiment the magnetic field sensor at an axial end of the axle unit is disposed on the end side, and particularly preferably so as to be centered on the end side. This disposal offers advantages in terms of the sensor quality as well as the complexity in terms of assembly and the requirement for installation space. The magnetic field sensor is in particular disposed on that end side of the axle unit that is disposed within the rotating member. The magnetic ring unit here is preferably disposed outside the rotating member. However, the magnetic ring unit can also be disposed within the rotating member. In such a design embodiment, the magnetic field sensor in relation to the axial direction can be disposed so as to be offset from the magnetic ring unit. However, the magnetic field sensor can also have been at the same axial longitudinal position as the magnetic ring unit.

The magnetic field sensor is in particular fastened directly to the axle unit. For example, the magnetic field sensor can be connected to the axle unit by means of insert-molding or the like. However, it is also possible for the magnetic field sensor to be fastened to the axle unit by means of at least one connecting structure. The magnetic field sensor can also at least in part be recessed in the end side of the axle unit. It can also be provided that the magnetic field sensor is disposed radially on an axial end of the axle unit.

In particular, the magnetic ring unit at least in portions surrounds the axle unit in an annular manner. The magnetic ring unit is in particular disposed radially about the axle unit. The magnetic ring unit is in particular disposed in such a manner in relation to the longitudinal direction of the axle unit. The magnetic ring unit and the axle unit are in particular disposed so as to be mutually coaxial. The axle unit here is preferably in the center of the assembly.

In one advantageous and preferred refinement the magnetic field sensor is disposed between the magnetic ring unit and the axle unit. In this instance, the magnetic field sensor is in particular disposed radially within the magnetic ring unit. In this instance, the magnetic ring unit surrounds in particular the magnetic field sensor in an annular manner.

In one other preferred and likewise advantageous refinement the magnetic ring unit is disposed between the magnetic field sensor and the axle unit. In this instance, the magnetic field sensor is disposed so as to be in particular radially outside the magnetic ring unit. The magnetic field sensor and the magnetic ring unit in this instance are in particular disposed so as to be radially on top of one another.

It is preferable for the rotating member by means of at least one bearing apparatus to be rotatably mounted on the axle unit. For example, the bearing apparatus comprises at least one rolling bearing and/or friction bearing and/or at least one bearing of any other suitable construction mode. In particular, the other rotatable components and, for example, the magnetic ring unit and/or the shielding member and/or the decoupling apparatus, by means of the at least one bearing apparatus, are also rotatably mounted on the axle unit.

The braking apparatus preferably comprises at least one wedge bearing apparatus. The braking apparatus can also be assigned at least one wedge bearing apparatus. The wedge bearing apparatus comprises in particular at least one, and preferably a plurality of, braking member(s). The braking members are in particular configured as rolling members. Cylindrical and/or spherical braking members can be provided. The wedge bearing apparatus here is in particular configured as a rolling bearing or comprises at least the latter.

The braking apparatus, by means of the wedge bearing apparatus and the coil unit and the magnetorheological medium, is in particular suitable and configured to dampen and/or to decelerate and/or to block in a targeted manner the rotatability of the rotating member. The braking apparatus, by means of the wedge bearing apparatus and the coil unit and the magnetorheological medium, after decelerating or blocking, is in particular suitable and configured to also reduce in a targeted manner again a moment for the rotatability of the rotating member.

The wedge bearing apparatus, in particular the rolling bearings thereof and preferably the braking member thereof, here is preferably disposed axially between the magnetic ring unit and the braking apparatus, in particular a coil unit of the braking apparatus. This results in a particularly advantageous spacing of the magnetic ring unit from the magnetic field of the coil unit.

The damping takes place in particular by way of the so-called wedge effect which has already been disclosed in earlier patent applications of the applicant (for example in DE 10 2018 100 390.0). To this end, braking members in the rotating member are situated so as to be adjacent to the coil unit and the axle unit. The braking members are surrounded by magnetorheological liquid. The magnetic field of the coil unit, by way of the housing of the rotating member, passes through the rolling members and closes above the axle unit. Wedges which brake the movement of the braking members, and thus of the rotating member, are formed in the magnetorheological fluid in the process. The braking members may be balls, cylindrical rollers or other parts.

The magnetic field sensor is in particular disposed axially between the wedge bearing apparatus and the magnetic ring unit. The magnetic field sensor can also be disposed axially between the coil unit and the magnetic ring unit.

The magnetic ring unit is in particular disposed axially between the wedge bearing apparatus and the magnetic field sensor. The magnetic ring unit can be disposed axially between the coil unit and the magnetic field sensor. Such embodiments enable a compact construction mode and at the same time an advantageous detection quality.

It is possible for the magnetic field sensor and in particular also the magnetic ring unit to be disposed on that end side of the rotating member on which an end side of the axle unit from which at least one signal line of the magnetic field sensor exits also lies, so that the signal line does not run through a magnetic field of the braking apparatus. This has the advantage that the signals of the magnetic field sensor are not disturbed by the magnetic field of the coil apparatus. The connector line of the braking device is in particular also disposed on this end side.

It is also possible that the magnetic field sensor and in particular also the magnetic ring unit are disposed on that end side of the rotating member that lies opposite an end side of the axle unit from which at least one signal line of the magnetic field sensor exits. In such a design embodiment, a transmission of signals in the signal line preferably takes place optically. In this way, the signals of the magnetic field sensor are not unfavorably disturbed, despite passing through the magnetic field of the coil apparatus. The transmission of signals takes place optically in particular at least where the signal line runs through the magnetic field of the coil apparatus. The signal line at least in portions comprises in particular at least one fiber optic cable, or is configured as the latter. The signal line at least in portions runs in particular through the bore in the axle unit.

The signal line at least in portions is preferably provided by at least one bore in the axle unit. The axle unit per se preferably serves as the fiber-optic cable. The bore is in particular the bore described above. In such an embodiment, the magnetic field sensor is in particular disposed on the end side on the axle unit, or within the axle unit.

In all design embodiments it is particularly preferable that the magnetic ring unit and/or the magnetic field sensor are/is disposed within a circumferential line delimited by the rotating member. In particular, the magnetic ring unit and/or the magnetic field sensor do not project beyond the circumference of the rotating member. In particular, the magnetic ring unit and the magnetic field sensor are disposed radially within the circumferential line of the rotating member. The circumferential line here is in particular delimited by the rotating member per se and not by an additional part disposed on the rotating member.

It is possible for the magnetic ring unit to be disposed outside of a receptacle space delimited by the rotating member. At least one sealing apparatus is disposed here in particular between the magnetic ring unit and the rotating member. The sealing apparatus bears in particular in a sealing manner on the rotating member and on the axle unit, so as to prevent the leakage of a magnetorheological medium disposed in the receptacle space. The sealing apparatus comprises in particular at least one sealing portion which bears on the axle unit. The sealing apparatus comprises in particular at least one sealing portion which bears on the rotating member. The sealing apparatus comprises at least one sliding seal, or is configured as the latter. However, it is also possible for the magnetic ring unit to be disposed within the receptacle space.

At least one, in particular magnetically conductive, wall is preferably disposed between the magnetic ring unit and the braking apparatus, in particular the coil unit of the latter. The wall is in particular suitable and configured to shield a magnetic field of the magnetic ring unit in such a manner that said magnetic field does not stray into the braking apparatus and/or the receptacle space and, as a result, unfavorably influences the magnetorheological medium.

To this end, the wall comprises in particular a ferromagnetic and/or paramagnetic material, or is composed of the latter. The wall can also comprise a diamagnetic material, or be composed of the latter. It is possible for the rotating member to be made from such a material. For example, a nickel/iron alloy comprising, for example, 69-82% nickel, is provided as material. Other metals (so-called μ-metals) that shield the magnetic field are also possible. The wall has in particular a relative magnetic permeability of at least 1000 and preferably at least 10,000, and particularly preferably at least 100,000, or at least 500,000.

The wall at least in part is preferably provided by an end wall of the rotating member. This is in particular a closed end wall through which the axle unit does not extend. In this instance, the wall is in particular configured integrally with the rotating member.

It is also possible and preferable for the wall to at least partially close off an end side of the rotating member that is configured so as to be opened. In this instance it is preferable for the axle unit to extend through the wall. In this instance, the wall has in particular at least one through opening for the axle unit. It is also possible and advantageous for the wall to be configured as a support structure for the sealing apparatus. At least one sealing portion each for the axle unit and the rotating member is in particular fastened to the wall. The wall in such embodiments is in particular fastened to the axle unit.

It is possible that the magnetic field sensor is disposed within a receptacle space delimited by the rotating member. The rotating member provides in particular a receptacle space, or at least partially delimits the latter. In particular, the magnetic field sensor by means of at least one sealing unit is separated from a magnetorheological medium disposed in the receptacle space. The sealing unit comprises in particular at least one sealing ring (O-ring) that runs radially about the axle unit, or the like. The sealing unit bears in particular in a sealing manner on the rotating member and the axle unit.

In this instance, the magnetic field sensor is in particular disposed in an end-side convexity of the rotating member. The magnetic ring unit in this instance lies in particular outside of the rotating member. The convexity is in particular disposed so as to be centered on the end side. In such a design embodiment, the magnetic field sensor is in particular disposed on the end side on the axle unit. The convexity is in particular disposed on that end side of the rotating member from which the axle unit does not exit. The magnetic field sensor can also be disposed outside the rotating member.

In one advantageous refinement of the braking device according to the invention, or of a braking device, it is preferably provided that the sensor apparatus is suitable and configured to detect, in addition to the rotary position of the rotating member, also at least one axial position of the rotating member in relation to the axle unit.

The magnetic field sensor in this instance is in particular configured as a three-dimensional magnetic field sensor. The detection of the axial position takes place in particular by means of the magnetic ring unit. The detection of the axial position takes place in particular by means of an axial position of the magnetic ring unit relative to the magnetic field sensor. Such a design embodiment is particularly advantageous for a braking device in which the operating states are also adjusted by means of pushing movements. The braking device is in particular suitable and configured to adjust operating states also by means of at least one pushing movement. The pushing movement takes place in particular in the direction of the rotation axis for the rotating movement of the rotating member.

For the detection of the axial position of the rotating member in relation to the axle unit it is preferably provided that the magnetic ring unit at least in portions surrounds a magnetic field sensor in an annular manner. The magnetic field sensor here is preferably disposed by way of an axial offset in relation to the axial center of the magnetic ring unit. This enables the axial position to be detected in a particularly precise manner, or by way of a high resolution. At the same time, the axial direction of movement can also be reliably identified in this way. In particular, the magnetic field sensor is disposed so as to be radially centered in relation to the magnetic ring unit.

The sensor apparatus is preferably suitable and configured to determine from the intensity, detected by the magnetic field sensor, of the magnetic field of the magnetic ring unit the axial position of the rotating member in relation to the axle unit. The sensor apparatus is in particular suitable and configured to determine from an algebraic sign of a variation of the intensity of the magnetic field of the magnetic ring unit an axial direction of movement of the rotating member in relation to the axle unit. However, it is also possible that the magnetic field sensor is disposed in the axial center of the magnetic ring unit.

The axle unit is in particular configured so as to be stationary. In particular, the axle unit provides a support structure for components received thereon, and in particular for the rotating member mounted thereon and/or for the braking apparatus and/or for the sensor apparatus. It can be provided that the axle unit in an assembled state of the braking device according to the intended use is connected to at least one console or the like. The axle unit comprises in particular at least one axle, in particular a hollow axle, or is configured as the latter. A longitudinal axis of the axle unit provides in particular the rotation axis of the rotating member. The axle unit and the rotating member are in particular disposed so as to be mutually coaxial.

The rotating member is in particular configured in the manner of a sleeve. The rotating member is in particular composed of a magnetically conducting material and preferably of a metallic, and particularly preferably, of a ferromagnetic material. The rotating member comprises in particular at least one rotating sleeve, or is configured as the latter. The rotating sleeve can also be referred to as a sleeve part. The rotating member is in particular configured as a rotating button. The rotating member is in particular configured so as to be cylindrical. The rotating member has in particular two end sides and a cylindrical wall extending therebetween. The rotating member here preferably has at least one closed end side. It is also possible for both end sides to be at least partially closed. It is also possible and advantageous for both end signs to be configured so as to be at least partially open. It is also preferable and advantageous for the rotating member to be configured as a hollow-cylindrical sleeve part that is configured so as to be open at the end sides. The sleeve part here in particular has an axial length which extends at least across the coil unit and/or the wedge bearing apparatus, in particular the braking members of the latter. The rotating member is in particular integrally configured, wherein the cylindrical wall is in particular integrally connected to at least one end wall.

The axle unit extends in particular into the rotating member and preferably into the receptacle space of the latter. The rotating member is in particular configured and disposed on the axle unit in such a manner that the axle unit extends from the rotating member at an open end side. The other end side of the rotating member here is in particular closed.

The braking apparatus comprises in particular at least one actuatable coil unit for generating a targeted magnetic field. The braking apparatus, and preferably at least the coil unit, are in particular disposed in a rotationally fixed manner on the axle unit.

The braking apparatus comprises in particular at least one magnetorheological medium. The medium is in particular a fluid which preferably comprises a liquid as a carrier for particles. In particular magnetic, and preferably ferromagnetic, particles are present in the fluid. It is also possible that the medium comprises only particles and the carrier medium is dispensed with (vacuum).

The braking apparatus is in particular actuatable as a function of at least one signal detected by the sensor apparatus. A control apparatus for actuating the braking apparatus as a function of the sensor apparatus is preferably provided. The control apparatus, as a function of the signal of the sensor apparatus, is in particular suitable and configured to generate a targeted magnetic field with the coil unit. The braking apparatus is in particular also a damper apparatus.

At least one receptacle space is in particular provided for the medium. The receptacle space is in particular provided or at least in part delimited by the rotating member. The receptacle space is in particular at least in part also delimited by the additional part and/or the axle unit. It is possible that further components and, for example, the wedge bearing apparatus and/or the coil unit and/or the magnetic field sensor and/or the magnetic ring unit are disposed in the receptacle space. It is possible that the receptacle space is subdivided into sub-spaces which are sealed in relation to one another. One sub-space is preferably provided for the magnetorheological medium. In particular, the magnetic field sensor is disposed in another sub-space, or not in the sub-space with the medium.

The braking device, in particular the braking apparatus, comprises in particular at least one wedge bearing apparatus and preferably at least one rolling bearing. The wedge bearing apparatus, preferably the braking members thereof, is in particular (directly) surrounded by the medium. The braking device preferably comprises at least one sealing apparatus and/or at least one sealing unit so as to prevent any leakage of the medium from the receptacle space. The receptacle space is in particular sealed in relation to the rotating member and the axle unit. In particular, the wedge bearing apparatus radially surrounds the axle unit.

The sensor apparatus is in particular configured as an absolute value transducer. The sensor apparatus can also be configured as an incremental transducer or in any other suitable construction mode. The sensor apparatus is in particular operatively connected to the control apparatus and/or the braking apparatus.

The magnetic ring unit is in particular configured in an annularly closed manner. The magnetic ring unit may also be configured in an annularly open manner. The magnetic ring unit comprises in particular at least one permanent magnet, or is configured as the latter. The magnetic ring unit provides in particular at least one magnetic north pole and at least one magnetic south pole. The magnetic ring unit is in particular assigned at least one shielding apparatus for shielding the magnetic field of the former from the magnetic field of the coil unit. The shielding apparatus comprises in particular the wall described above, or is provided by the latter.

The magnetic field sensor is in particular suitable and configured to detect the alignment of the magnetic field of the magnetic ring unit. The magnetic field sensor is in particular configured as a Hall sensor, or comprises at least one such Hall sensor. Other suitable sensor types for detecting the magnetic field of the magnetic ring unit are also possible.

A braking apparatus which is suitable for the use with the invention is also described in patent application DE 10 2018 100 390.0. The entire disclosure of DE 10 2018 100 390.0 is thus incorporated in the disclosure content of the present application.

The applicant reserves the right to claim a computer mouse having at least one braking device as described above. The braking devices here provide in particular a mouse wheel of the computer mouse or of a similar input apparatus.

At least one closed chamber (which is sealed in relation to the outside) is in particular configured between the rotating member and the axle unit. In particular, the rotating member is rotatably received (mounted) on the axle unit (at a first bearing point) at a first end of the closed chamber. The closed chamber is in particular substantially (completely) filled with a magnetorheological medium.

The rotating member is in particular received (mounted) so as to be axially displaceable on the axle unit so that a volume of the closed chamber is varied by a relative axial displacement of the rotating member in relation to the axle unit, so as to compensate for temperature-related volumetric variations.

The rotating member is in particular displaceably received (mounted) on the axle unit at a second end of the chamber. A diameter of the first bearing point at the first end of the closed chamber differs in particular from a diameter of the second bearing point at the second end of the closed chamber.

In particular, a stationary holder is comprised. The axle unit is in particular connected in a rotationally fixed manner to the holder, and extends in the axial direction. The rotating member comprises in particular a rotating part which is rotatable about the axle unit and configured so as to be hollow (and cylindrical on the inside). An encircling gap is in particular configured between the axle unit and the rotating member. The gap is in particular at least partially filled with a magnetorheological medium.

The axle unit comprises in particular a core which extends in the axial direction and is of a magnetically conductive material, and an electric coil (coil unit). The coil is in particular wound about the core in the axial direction and defines in particular a coil plane so that a magnetic field of the electric coil extends transversely (to the axial direction) through the axle unit. A maximum (external) diameter of the electric coil in a radial direction within the coil plane is in particular larger than a minimum (external) diameter of the core in a radial direction transverse (perpendicular) to the coil plane.

Further advantages and features of the present invention are derived from the description of the exemplary embodiments which are explained hereunder with reference to the appended figures.

BRIEF DESCRIPTION OF THE FIGURES

In the figures:

FIGS. 2-7a show purely schematic illustrations of further braking devices in sectional lateral views;

FIGS. 7b-7d show detailed views of the braking device of FIG. 7a;

DETAILED DESCRIPTION OF THE INVENTION

Figure 1:
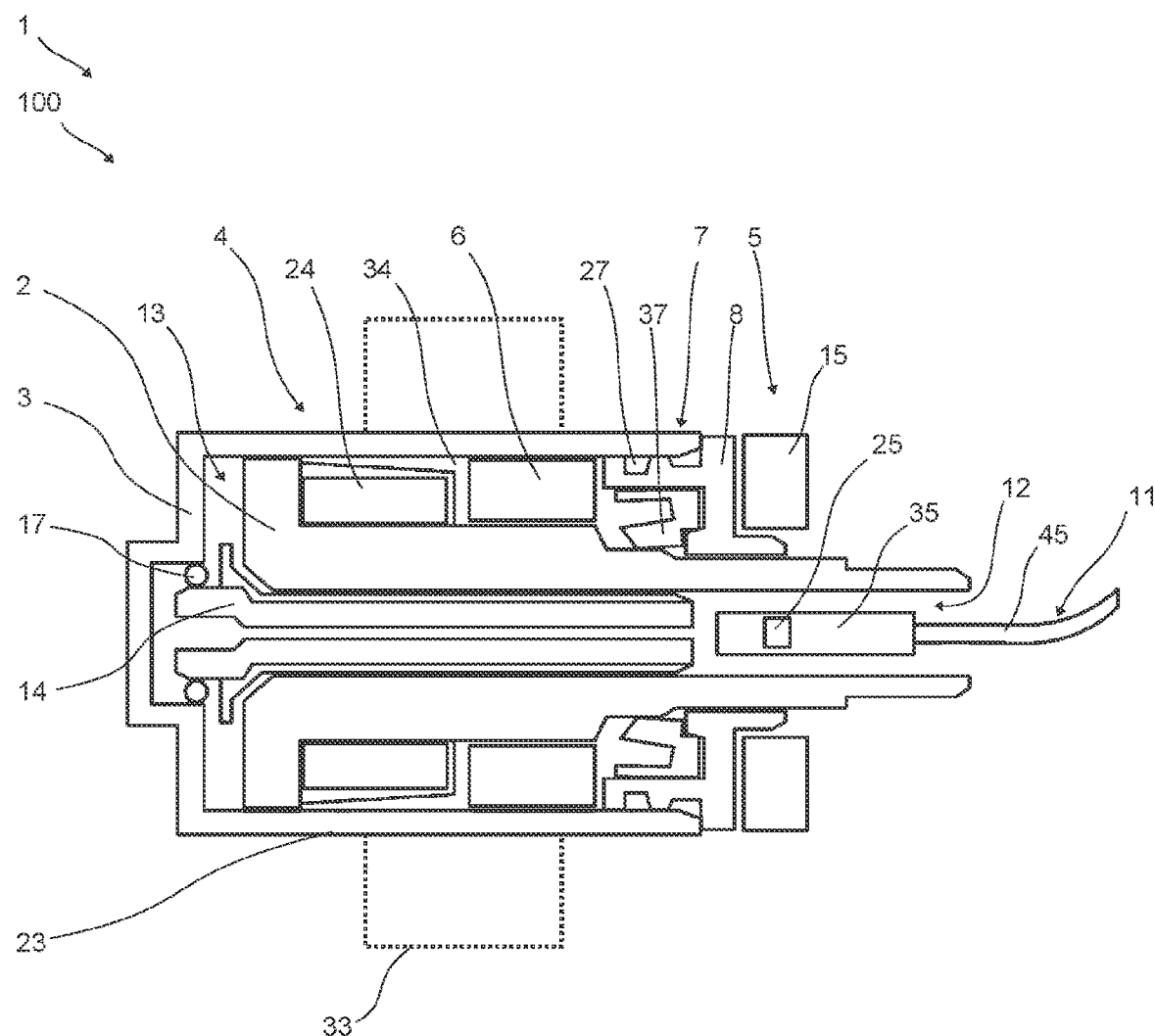
FIG. 1 shows a purely schematic illustration of a braking device in a sectional lateral view.

FIG. 1 shows a braking device 1 which here is configured as an operating apparatus 100 and for adjusting operating states has a rotatable rotating member 3 that is configured as a finger wheel 23, or thumb wheel. The operation here thus takes place at least by rotating the rotating member 3.

The rotating member 3, by means of a bearing apparatus 22 not shown in more detail here, is rotatably mounted on an axle unit 2. The rotating member 3, by means of a wedge bearing apparatus 6 which here is configured as a rolling bearing, can also be rotatably mounted on an axle unit 2. However, the wedge bearing apparatus 6 is preferably not, or only partially, provided for mounting the rotating member 3 on the axle unit, but rather serves for the braking apparatus 4 discussed hereunder. The rolling members here serve as braking members 44 in this case.

The axle unit 2 can be assembled on an object to be operated, and in an interior of a motor vehicle, for example, or on a medical apparatus or a smart device. To this end, the axle unit 2 may have assembly means not illustrated in more detail here.

Here, or in the design embodiments hereunder, it can be provided that the rotating member 3 is also displaceable in the longitudinal direction, or along the rotation axis, on the axle unit 2. In this case, operation takes place by rotating as well as pushing and/or pulling or displacing the rotating button 3.

The rotating member 3 here is configured in the manner of a sleeve, and comprises a cylindrical wall and an end wall integrally connected thereto. The axle unit 2 exits at an open end side of the rotating member 3.

The finger wheel 23 can be equipped with an additional part 33 which is indicated by dashed lines here. As a result, an enlargement of the diameter is achieved so that the rotatability is facilitated, for example in the case of a wheel of a computer mouse or a game controller that is rotatable using a finger, or a rotating wheel in a computer keyboard thumb wheel.

The rotating movement of the rotating button 3 here is dampened by a magnetorheological braking apparatus 4 which is disposed in a receptacle space 13 in the interior of the rotating button 3. The braking apparatus 4 by way of a coil unit 24 generates a magnetic field which acts on a magnetorheological medium 34 situated in the receptacle space 13. This leads to local and intense crosslinking of magnetically polarizable particles in the medium 34. The braking apparatus 4 as a results enables targeted deceleration and even complete blocking of the rotating movement. In this way, a haptic feedback can take place during the rotating movement of the rotating member 3 by way of the braking apparatus 4, for example by a correspondingly perceivable ripple or by dynamically adjustable detents.

For supplying and actuating the coil unit 24, the braking apparatus 4 here has an electrical connection 14 which is configured, for example, in the manner of a circuit board or a printed circuit board, or as a cable line. The connector line 11 here extends through a bore 12 which runs in the longitudinal direction of the axle unit 2.

The receptacle space 13 in relation to the outside here is sealed by a sealing apparatus 7 and a sealing unit 17, so as to prevent any leakage of the medium 34. The sealing apparatus 7 here closes off the open end side of the rotating member 3. To this end, a first sealing part 27 bears on the internal side of the rotating member 3. A second sealing part 37 bears on the axle unit 3. The sealing parts 27, 37 here are fastened to a support structure configured as a wall 8.

The sealing unit 17 here is configured as an O-ring and radially surrounds the axle unit 3. The sealing unit 17 bears on the axle unit 2 and on the rotating member 3. As a result, that part of the receptacle space 13 that is filled with the medium 34 is sealed in relation to another part of the receptacle space 13.

In order to monitor the rotary position of the rotating member 3 and to be able to use said rotary position for actuating the braking apparatus 4, a sensor apparatus 5 is provided here. The sensor apparatus 5 comprises a magnetic ring unit 15 and a magnetic field sensor 25.

The magnetic ring unit 15 here is diametrically polarized and has a north pole and a south pole. The magnetic field sensor 25, here configured as a Hall sensor, measures the magnetic field emanating from the magnetic ring unit 15, and thus enables a reliable determination of the rotation angle.

Moreover, the magnetic field sensor 25 here is preferably three-dimensionally configured such that, in addition to the rotation, an axial displacement of the rotating member 3 in relation to the axle unit 2 can also be measured. As a result, the rotation as well as a pushbutton function (push/pull) can be simultaneously measured using the same sensor 25. However, the braking device 1 can also be equipped only with a rotating function.

The sensor apparatus 5 is particularly advantageously integrated in the braking device 1. To this end, the sensor 25 here is inserted in the bore 12 of the axle unit 2. The magnetic ring unit 15 radially surrounds the sensor 25 and is fastened to the rotating member 3. This has the advantage that not longitudinal tolerances but only diameter tolerances, which can be precisely produced, become relevant. The radial bearing play between the rotating member 3 in rotation and the stationary axle unit 2 are correspondingly minor and can be readily managed also in the case of volume production.

A further advantage lies in that axial movements, or displacements, between the rotating member 3 and the axle unit 2 do not unfavorably influence the sensor signal because measurement takes place in the radial direction, and the radial spacing is substantially decisive in terms of the quality of the measurement signal.

An advantage also lies in that the assembly shown here is particularly insensitive in relation to contamination and liquids, because the sensor is disposed on the inside. Moreover, the sensor 25 in the bore 12 can be insert-molded with a plastics material, for example.

In order to further improve the disposal of the sensor 25, the latter here is disposed on a circuit board 35, or a printed circuit board. The contact for the coil unit 24, or the connection 14 thereof, here is also on the circuit board 35 in this case.

Furthermore, the connector line 11 by way of which the entire braking device 1 is connected to the system to be operated is also connected to the circuit board 35. In this way, a 6-pin or 8-pin plug, for example, can be fastened to the circuit board 35, the sensor 25 as well as the coil unit 24 in this instance being connected to the corresponding controller by way of said plug. The signal line 45 for transmitting the sensor signal is also disposed in the connector line 11 here.

In this way, the braking device 1 can be installed in a particularly simple and rapid manner. In order to design the entire system to be particularly robust in relation to errors and interferences, the circuit board 35 in the bore 12, including the sensor 25 in the axle unit 2, can be cast.

Figure 2:
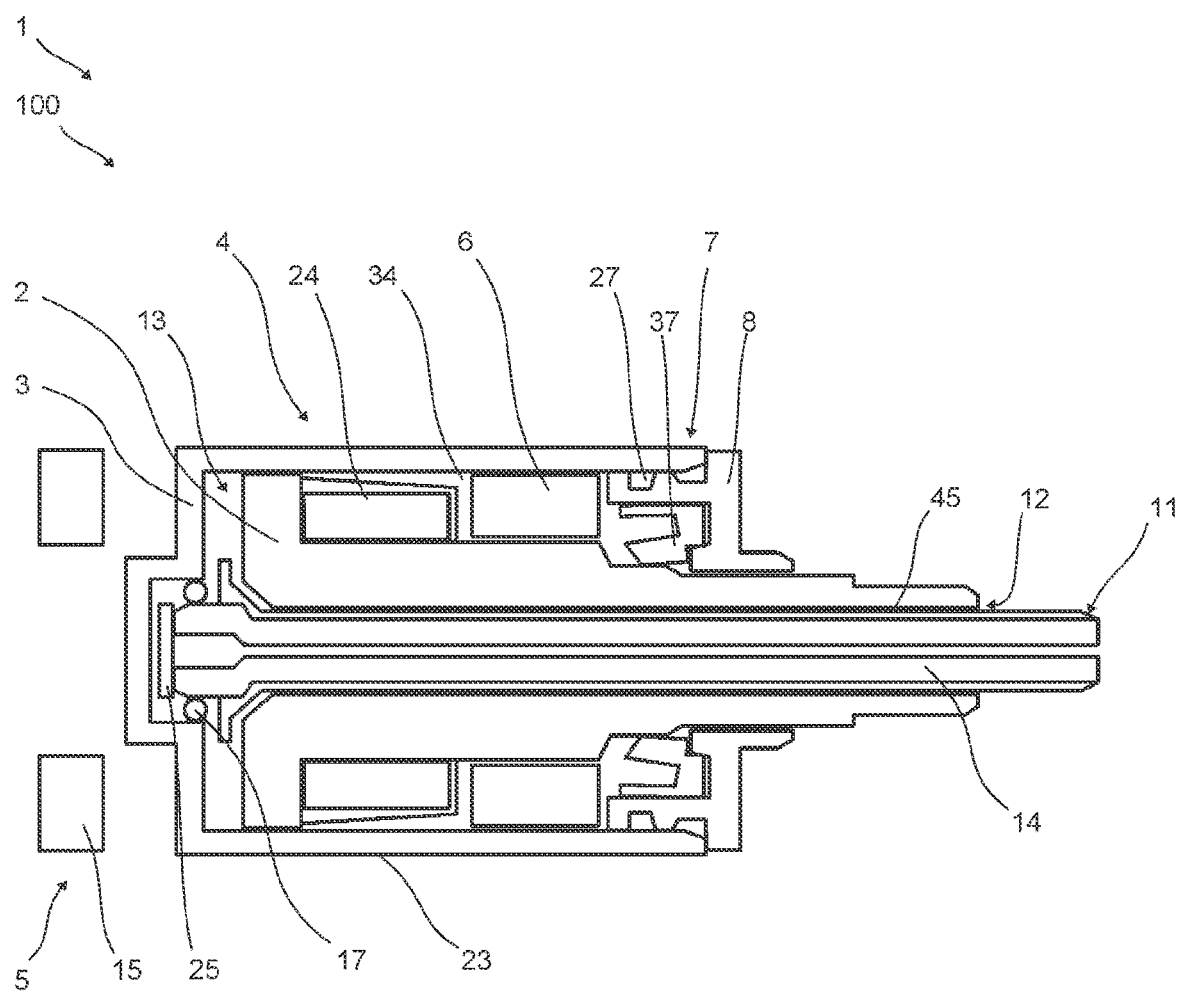

A design embodiment of the braking device 1, which differs from the previously described embodiment substantially in terms of the constructive disposal of the sensor apparatus 5, is shown in FIG. 2. The magnetic ring unit 15 here is disposed in this case on that end side of the rotating member 3 that is closed, or through which the axle unit 2 does not extend.

Provided here is a disposal for the magnetic field sensor 25 within the rotating member 3 that particularly saves installation space. To this end, the magnetic field sensor 25 is disposed in the receptacle space 13. The sensor 25 here lies in that part of the receptacle space 13 that by the sealing unit 17 is separated from the part with the medium 34. This part of the receptacle space 13 here lies in a central convexity of the rotating member 3. The sensor 25 here is fastened to an end side of the axle unit 2 in this case.

The axially offset positioning of the magnetic ring unit 15 here is highly schematized and can also take place for example so as to bear more closely on the rotating member 3, so that the magnetic ring unit 15 surrounds the sensor 25 in an annular manner.

In the design embodiment shown here, the sensor 25 is disposed on that end side of the rotating member 3 that lies opposite the exit side for the signal line 45, or the connector line 11. Therefore, the sensor signal here is directed through the bore 12 in the axle unit to the opposite side and therefore has to pass through the magnetic field of the coil unit 24.

In order to avoid an interference of the signal, the signal transmission here takes place optically. To this end, the light signal here is simply beamed through the bore 12 of the axle unit 2. However, it can also be provided that the signal line 45, at least in the region of the coil unit 24, is configured as a fiber-optic cable. Corresponding photodiodes, not illustrated in more detail here, are provided for transmitting or receiving the signals.

Figure 3:
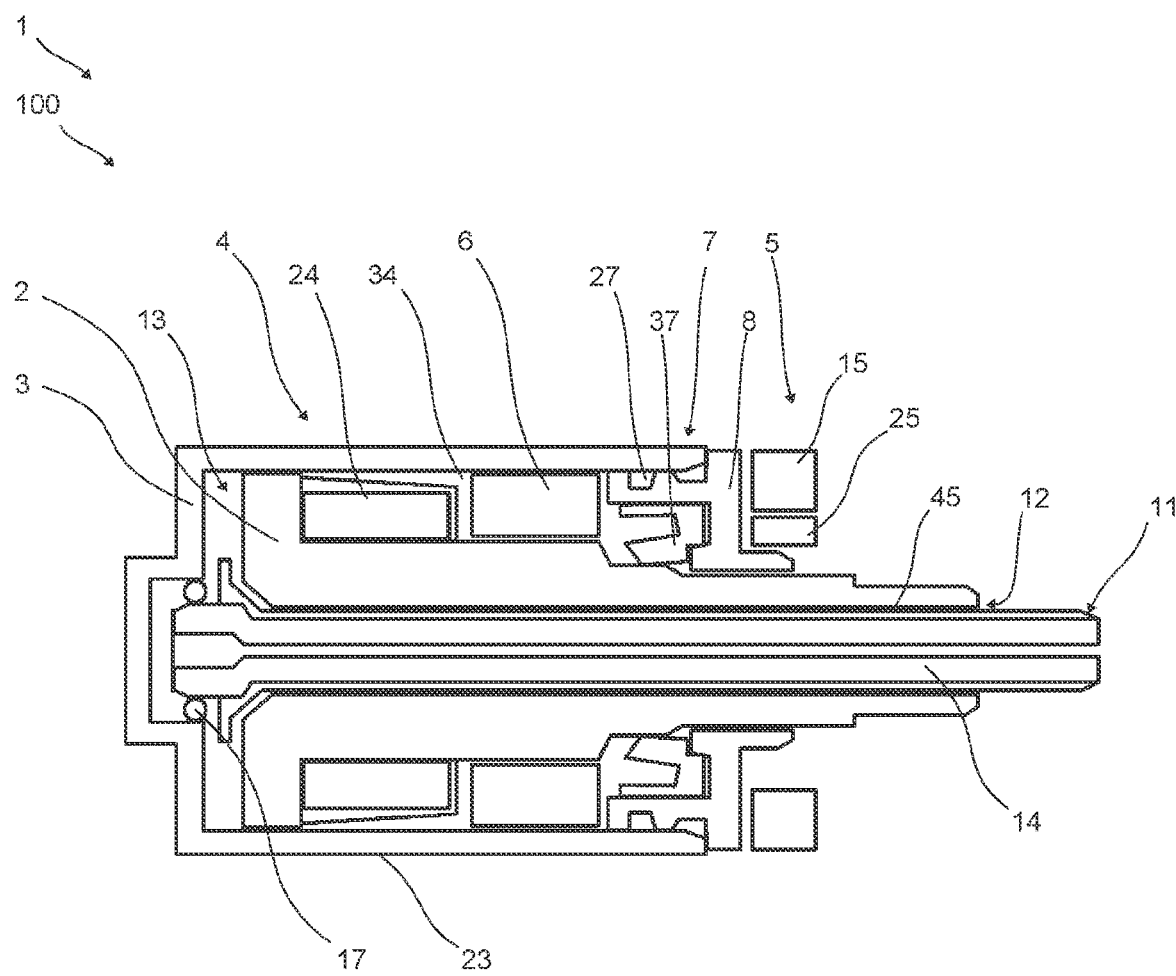

FIG. 3 shows a design embodiment which differs from the previously described embodiments substantially in terms of the constructive disposal of the sensor apparatus 5. The magnetic field sensor 25 here is disposed outside the axle unit 2 and is radially surrounded by the magnetic ring unit 15. Such a design embodiment is particularly advantageous when a particularly small axle diameter is required. Moreover, a considerable shortening of the tolerance chain is achieved. The sensor 25 here is fastened to the axle unit 2 in a locationally fixed manner in this case, while the magnetic ring unit 15, conjointly with the rotating member 3, is rotatable. Moreover, such an assembly is particularly less prone to errors resulting from tolerances, because only the positional tolerance of the axle unit 2 is substantially relevant. Moreover, the assembly shown here has the advantage that measuring in a particularly reproducible manner can also take place in the axial direction, this being very advantageous in the case of an embodiment with a push function.

Figure 4:
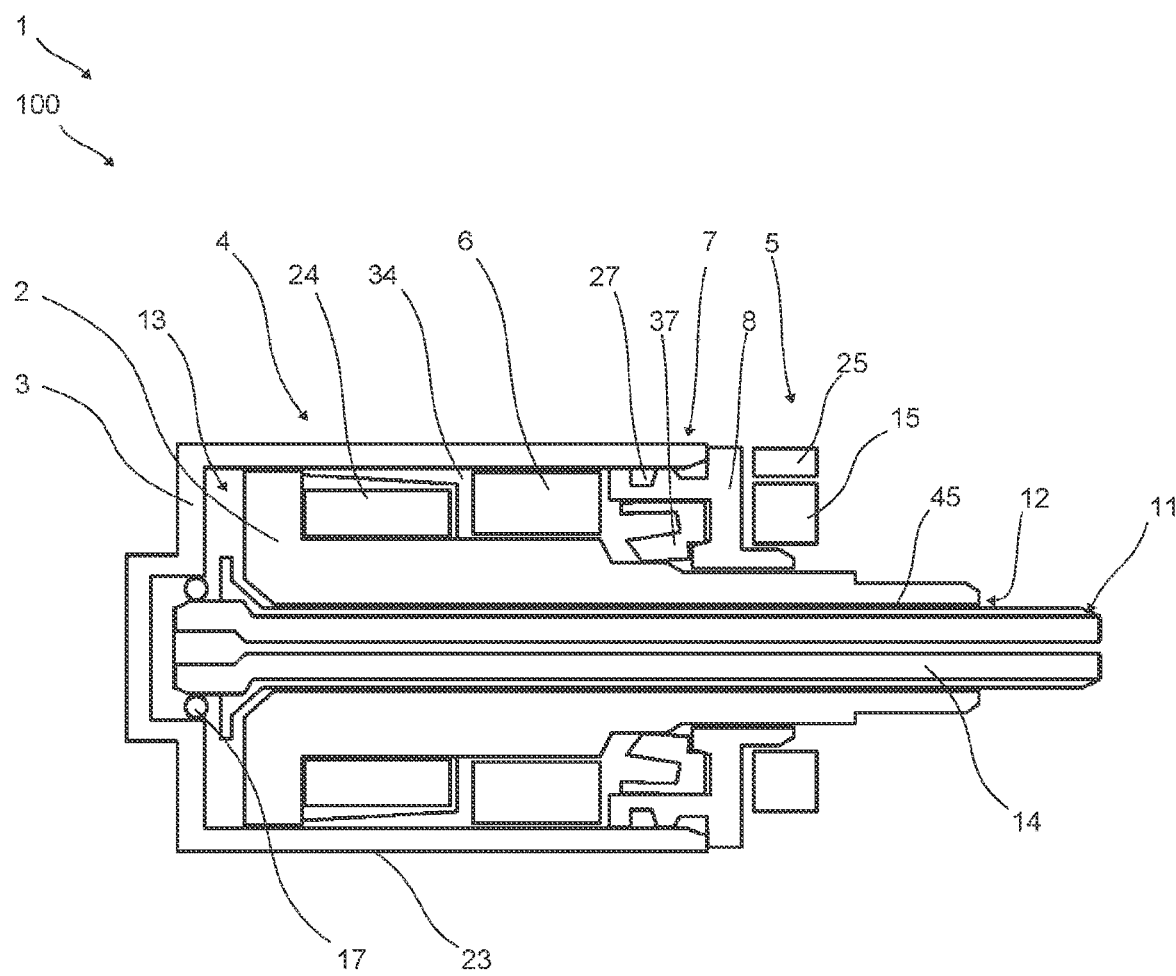

FIG. 4 shows a design embodiment which differs from the previously described embodiments substantially in terms of the constructive disposal of the sensor apparatus 5. The magnetic field sensor 25 here is disposed radially outside the magnetic ring unit 15. This offers particularly simple manufacturing of little complexity, and at the same time a considerable shortening of the tolerance chain. For example, the sensor 25 can be fastened to the axle unit 2. However, it is also possible for the sensor 25 to be integrated in a closure cap or the like.

Figure 5:
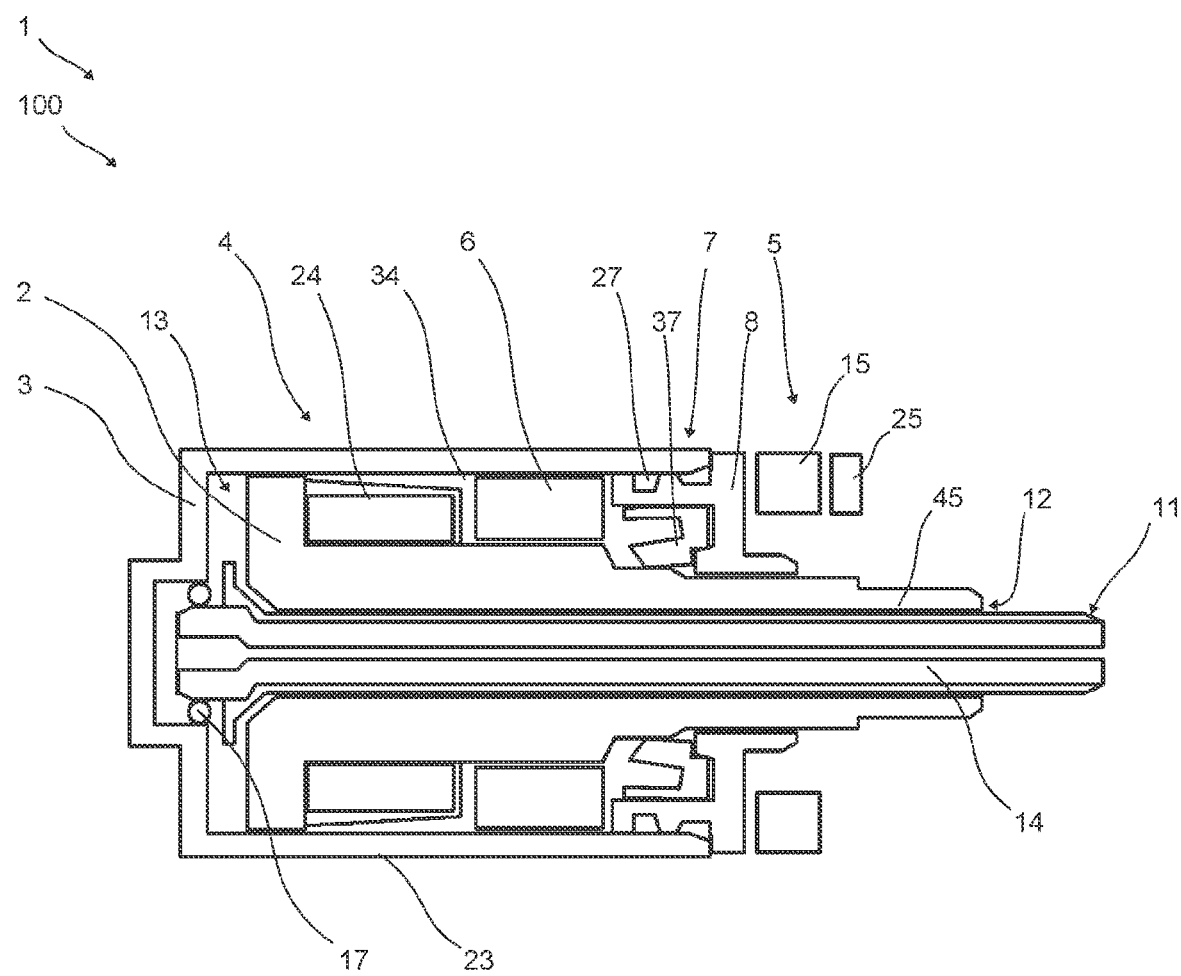

An embodiment which differs from the previously described embodiments substantially in terms of the constructive disposal of the sensor apparatus 5 is shown in FIG. 5. The magnetic field sensor 25 here is positioned axially beside the magnetic ring unit 15. Such an embodiment is advantageous, for example, when the magnetic ring unit 15 is to be designed to be particularly narrow in the axial direction. It is advantageous that the magnetic ring unit 15 in the embodiment shown here can be designed so as to be wider in the radial direction. The embodiment shown here also offers a considerable shortening of the tolerance chain.

The wall 8 in the embodiments shown in FIGS. 1 and 3 to 5 is configured so as to be magnetically conductive. As a result, it can be prevented that the magnetic field of the magnetic ring unit 15 and the magnetic field of the coil unit 24 have a mutual unfavorable influence. For example, the wall 8 is configured from a metal that shields magnetic field and, for example, from a metal having a relative magnetic permeability of at least 100,000. The wall 8 is made from a nickel/iron alloy, for example. The wall 8 here at the same time serves as a connection for the sealing apparatus 7. In order for the magnetic field of the magnetic ring unit 15 shown in FIG. 2 to be shielded from the magnetic field of the coil unit 24, the end side of the rotating member 3 there is made from a magnetically conductive material.

Figure 6:
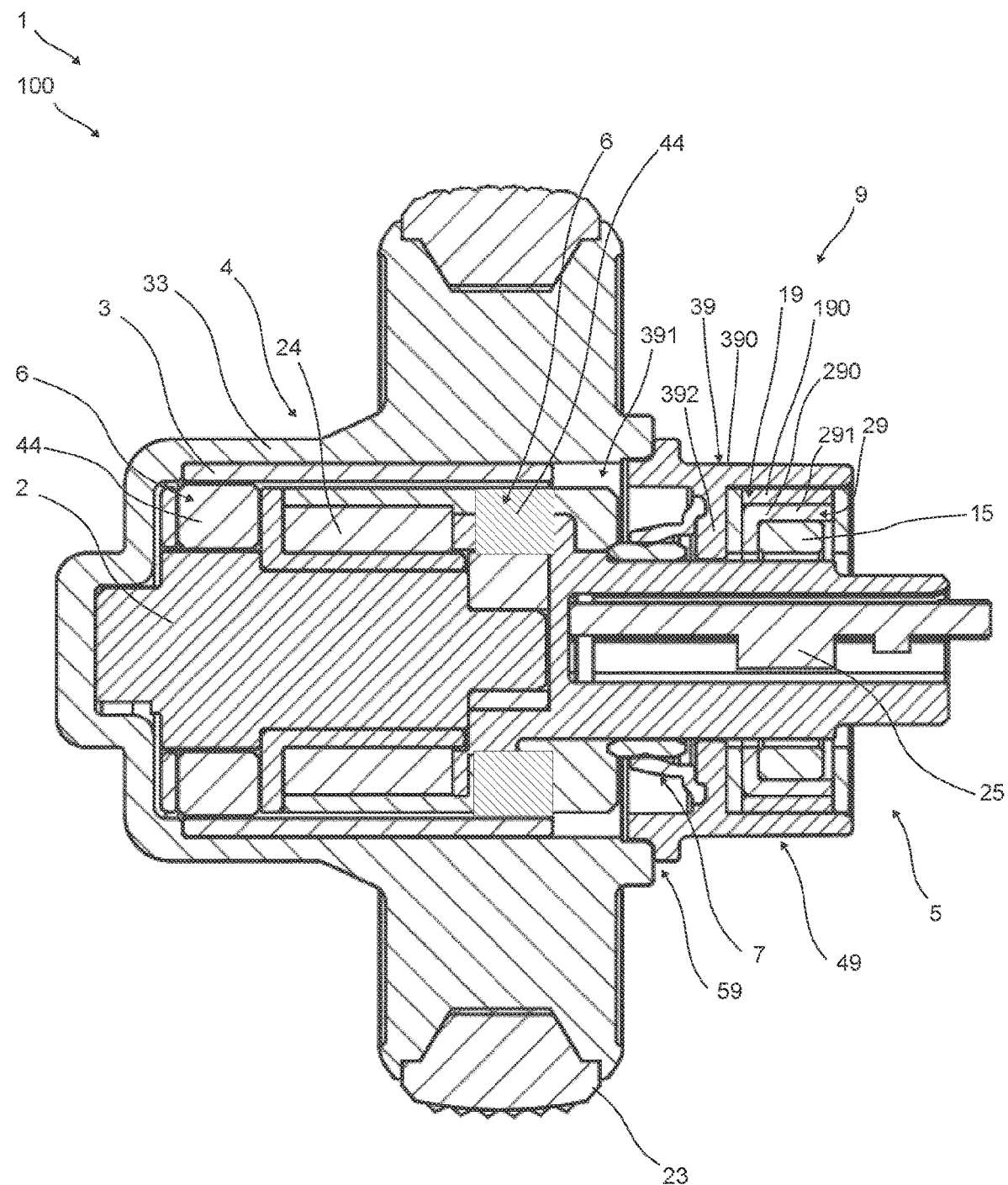

FIG. 6 shows a braking device according to the invention having a mounting apparatus 49 and a shielding apparatus 9 for shielding the sensor apparatus 5 from the magnetic field of the coil unit 24 of the braking apparatus 4. The braking device 1 shown here, in addition to the shielding apparatus 9, differs from the previously described braking devices 1 in particular also in terms of the design embodiment of the rotating member 3 and of the additional part 33. The braking device shown here is, for example, a mouse wheel of a computer mouse.

The rotating member 3 here is configured as a cylindrical sleeve and on the external side thereof completely surrounded by the additional part 33. The additional part 33 here closes off the rotating member on that radial end side that faces away from the magnetic ring unit 15. In order to fasten the additional part 33 in a supporting manner, the mounting apparatus 49 can comprise a fastening apparatus 59.

The additional part 33 has a radially encircling elevation having a considerably enlarged diameter. As a result, the braking device 1 shown here is particularly readily suitable as a mouse wheel of a computer mouse or the like. The elevation here is designed having a groove in which a particularly slip-proof material and rubber, for example, is embedded here.

The braking device 1 shown here has two mutually spaced apart wedge bearing apparatuses 6. The wedge bearing apparatuses 6 are in each case equipped with a plurality of braking members 44 that are disposed radially about the axle unit 2. The coil unit 24 is disposed between the wedge bearing apparatuses 6. The braking members 44 here are, for example, rolling members which roll on the internal side of the rotating member 3, or on the external side of the axle unit 2.

The magnetic ring unit 15 is coupled in a rotationally fixed manner to the rotating member 3 such that the magnetic ring unit 15 conjointly rotates when the rotating member 3 is rotated. The magnetic field sensor 25 here is inserted in the bore 12 of the axle unit 2. The magnetic ring unit 15 radially surrounds the sensor 25 and is axially disposed to sit on the end. The magnetic field sensor 25 here is disposed at an axial offset from the axial center of the magnetic ring unit 15. This results in the axial position of the rotating member 3 in relation to the axle unit 2 to be detected by way of a particularly high resolution and in a reproducible manner.

The shielding apparatus 9 comprises a shielding member 19 configured here as a shielding ring 190. The shielding apparatus 9 moreover comprises a separation unit 29 which here is provided by a gap 290 filled with a filler medium 291. Moreover, the shielding apparatus 9 comprises a magnetic decoupling apparatus 39 which here is provided by the mounting apparatus 49 and comprises a decoupling sleeve 390 and a decoupling gap 391.

The decoupling sleeve 190 here comprises an axial wall 392 on which the sealing apparatus 7 is disposed. Moreover, a bearing apparatus 22, not illustrated in more detail here, can be disposed on the axial wall 392.

The shielding member 19 here is equipped with an L-shaped cross section and is made from a material which is particularly magnetically conductive. The shielding member 19 surrounds the magnetic ring unit 15 on the radial external side thereof and on the axial side thereof that faces the coil unit 24. The gap 290 for magnetic decoupling is disposed between the shielding member 19 and the magnetic ring unit 15 and filled with a filler medium 291. The filler medium 291 here has a particularly minor magnetic conductivity. Moreover, the magnetic ring unit 15 by way of the filler medium 291 is fastened to the shielding member 19.

Magnetic decoupling between the rotating member 3 and the shielding member 19 is achieved by the decoupling apparatus 39. To this end, the decoupling sleeve 390 and a filler medium disposed in the decoupling gap 391 likewise have a particularly minor magnetic conductivity. The decoupling sleeve 391 here is connected in a rotationally fixed manner to the shielding member 19 and to the additional part 33 as well as to the rotating member 3.

In order to be able to decouple the rotating member 3 even better from the sensor apparatus 5, the rotating member 3 here is disposed so as to be axially spaced apart from the decoupling sleeve 390. That end of the rotating member 3 that faces the magnetic ring unit 15 here does not protrude beyond the braking member 44. Moreover, the rotating member 3 is axially offset rearward, or shortened, in relation to the additional part 33. This results in a particularly advantageous magnetic and spatial separation of the rotating member 3 and the decoupling sleeve 390 on a very small installation space.

Such a design embodiment offers particularly good shielding because the magnetic field of the coil unit 24 for the braking effect flows by way of the rotating member 3. In order that this magnetic flux influences the sensor 25 as little as possible, the rotating member 3 in the axial direction terminates earlier, and the magnetically non-conducting additional part 33 assumes the constructive functions (bearing point, sealing points . . . ). As a result, the spacing from the sensor 25 is also larger, and the construction module overall becomes lighter.

The rotating member 3 is made from a magnetically particularly conductive material. In contrast, the additional part 33 and the decoupling sleeve 390 are made of a magnetically non-conductive material. The shielding member 19 and the rotating member 3 are here for example made of a μ-metal. The components which are described here as magnetically non-conductive are composed of plastics material, for example, and have a relative magnetic permeability of below 10.

The problematic fields which can typically disturb the measurement of the rotation angle are above all the fields in the radial direction. These fields here are shielded by a shielding member 19 which acts as a casing and is made from a suitable material, for example magnetically conducting steel. In this way, the magnetic field of the magnetic ring unit 15 can even be additionally amplified. As a result, the magnetic ring unit 15 can be of a smaller (thinner) size, and material, construction volume and production costs can be saved in this way.

According to the invention, the construction is also improved in that the wall thickness of the shielding member 19 is varied, and a gap 290 is provided between the magnetic ring unit 15 and the shielding member 19. The shielding and the amplification can be optimally adapted as a result of the gap 290 between the ring 15 and the shielding member 19. The material of the shielding member 19 here is chosen such that said material does not become magnetically saturated in order for outer magnetic fields to be sufficiently shielded (saturated material permits magnetic fields to pass like air, thus at the magnetic constant μ0). In the case of an advantageous basic design of the gap 290 between the ring 15 and the shielding member 19, the magnetic field does not close excessively over the shielding member 19, and the field in the center at the sensor 25 is sufficiently homogenous and is increased in comparison to a ring 15 of identical or larger size without the shielding member 19.

The sizing of the shielding apparatus 9 shown here is particularly readily suitable for a mouse wheel of a computer mouse and has the following dimensions, for example. The shielding ring 190 is 0.5 mm thick; the spacing between the shielding ring 190 and the ring 15 is also 0.5 mm; the width of the ring 15 is 2 mm; and the diameter of the ring 15 is 8 mm. In this case, the potential interference field of the coil unit 24 is 140 μT, this resulting in a potential error in the angle measurement of 0.1° (cf. terrestrial magnetic field: approx. 48 μT in Europe).

Figure 7A:
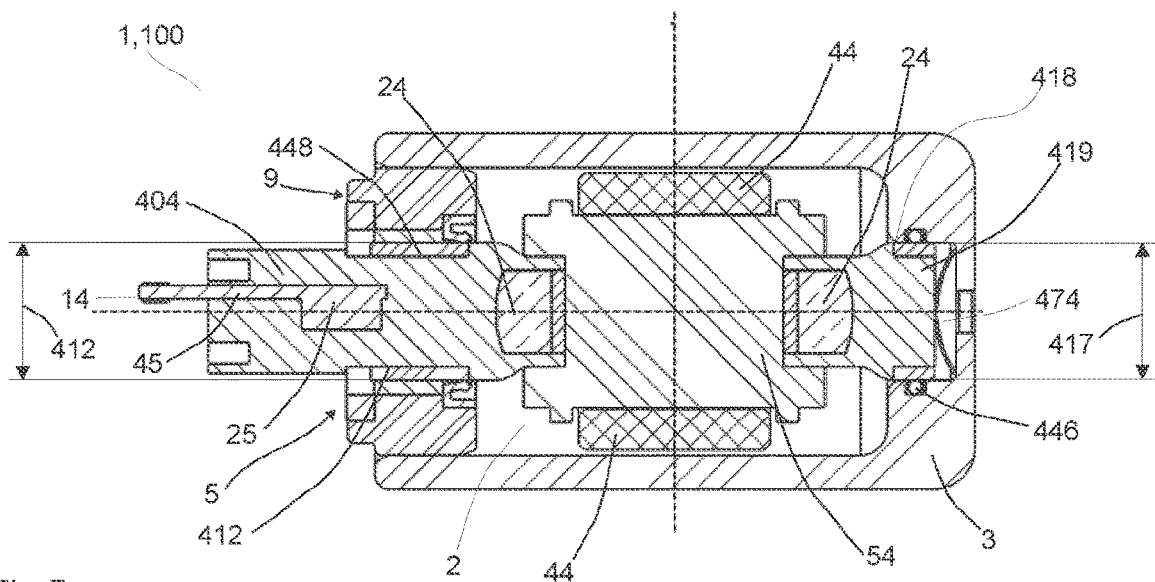

FIG. 7a shows a variant in which a push/pull function is integrated. A momentary contact switch 474 can be activated and is automatically reset. The diameters of the two bearing points 412, 418 are chosen so as to be of identical size. As a result, the volume within the chamber does not vary in the event of a relative axial displacement of the first braking component 2 (corresponding to the axle unit) in relation to the second braking component 3 (corresponding to the rotating member). A displacement of the first braking component 2 toward the left in the orientation of FIG. 7a leads to the spacing of the magnetic field sensor 25 from the magnetic ring unit 15 being enlarged or varied.

Figure 7B:
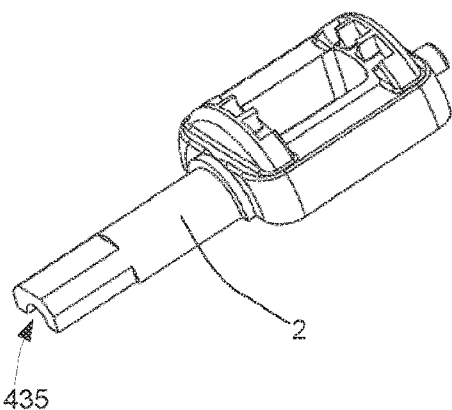
Figure 7C:
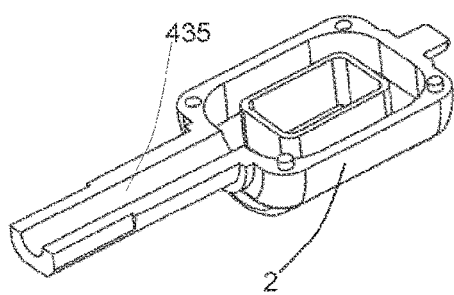
Figure 7D:
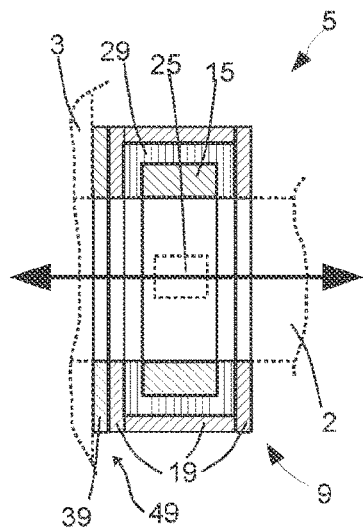
Figure 7E:
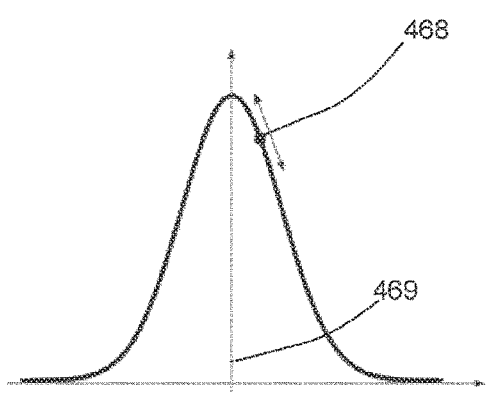
FIG. 7e shows a schematic illustration of a profile of a sensor signal.

The received signal 468 according to the illustration of FIG. 7e varies as a result of an axial displacement. FIG. 7e shows the profile of the amplitude 469 of the signal 468 detected by the magnetic field sensor 25 as a function of the axial displacement of the braking components 2, 3 (horizontal axis). The amplitude 469 of the detected signal 468 varies as a result of an axial displacement of the magnetic field sensor 25 in relation to the magnetic ring unit 15. An axial displacement, or depressing of the additional part 33, or a lateral displacement of the additional part 33 can be detected in this way. The rotation angle can also be detected by the same sensor, wherein the direction of the magnetic field is determined in order for the rotation angle to be detected. The intensity determines the axial position. An axial activation of the braking device 1, or of the momentary contact switch 474, can therefore be concluded from a variation of the signal 468. This is advantageous because a single (multi-dimensional) Hall sensor can be used for determining the angular position and determining an axial position.

The first braking component 2 in FIG. 7a is disposed in the interior of the second braking component 3 and is held in a form-fitting and/or force-fitting manner by a mounting 404. The mounting 404 can be fastened to an external console or to an apparatus, for example. The mounting 404 is regularly fastened in a rotationally fixed manner. The second braking component 3 is received on the first braking component 2 so as to be continuously rotatable relative to the latter.

As is illustrated in FIGS. 7b and 7c, the mounting 404 can preferably be embodied in two parts. As a result, the assembling of the electrical lines and in particular of the sensor line 45 within the first braking component 2 is simplified above all. The cables can be installed through the cable conduit which is open here.

The sensor apparatus 5 is illustrated once again in detail in FIG. 7d. The first braking component 2 and the second braking component 3, here embodied as a rotating part, are only indicated (dashed lines). The sensor apparatus 5 by way of the decoupling apparatus 39 is supported on the rotatable second braking component 3 so as to be magnetically decoupled. The shielding apparatus 9 here is composed of a shielding member 19 in three parts. Moreover, a separation unit 29 for magnetic separation is also present. The magnetic ring unit 15 is utilized for measuring the orientation, or the rotation angle, of the magnetorheological braking apparatus 1. The magnetic field sensor 25 is disposed within the first braking component 2. Moreover, minor relative axial displacements can be utilized for detecting depressing of an operating button, for example.

FIGS. 8a to 8e show apparatuses which are equipped with the invention. The braking devices 1 here are in each case embodied as a haptic operating apparatus 100.

Figure 8A:
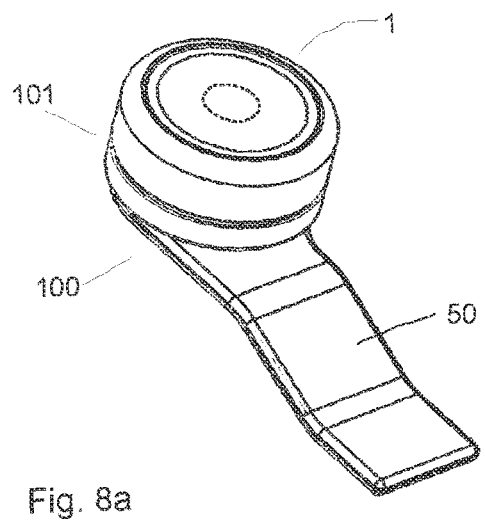
FIGS. 8a-8e show schematic, three-dimensional views of braking devices.

FIG. 8a shows a haptic operating button 101. The operating button is fastened by way of a console 50. The operating button 101 is operated by way of the sleeve part.

The user interface can additionally be utilized for transmitting information.

Figure 8B:
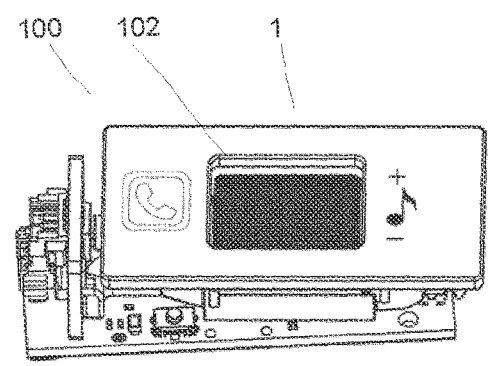

The braking device 1 in FIG. 8b is illustrated as a thumb wheel 102 having a haptic operating apparatus 100. The thumb wheel 102 can preferably be used in steering wheels, for example. However, the thumb wheel is not limited to this application. Depending on the installation situation, the thumb wheel 102 can generally also be utilizable using any other finger.

Figure 8C:
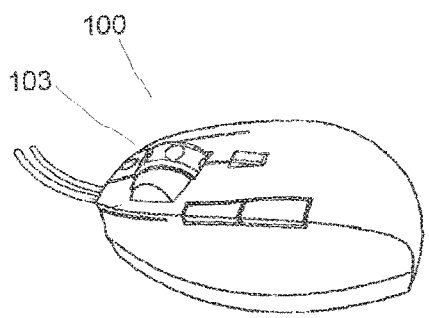
Figure 8D:
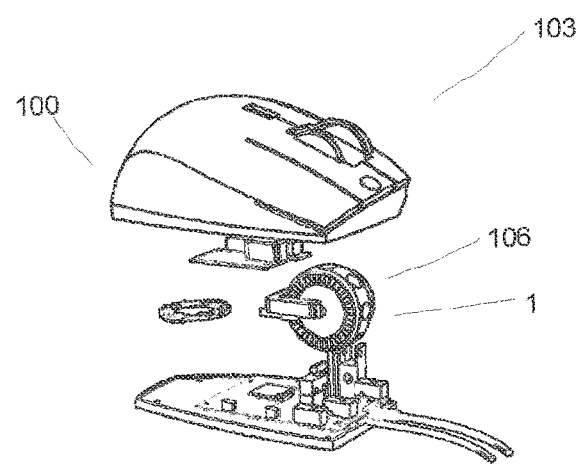

The braking device 1 according to the invention in FIG. 8c and FIG. 8d is embodied as a mouse wheel 106 of a computer mouse 103. The magnetorheological braking apparatus 1 can be utilized for controlling haptic feedback.

Figure 8E:
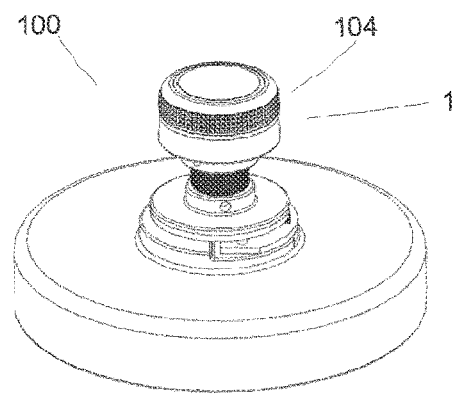
Figure 8F:
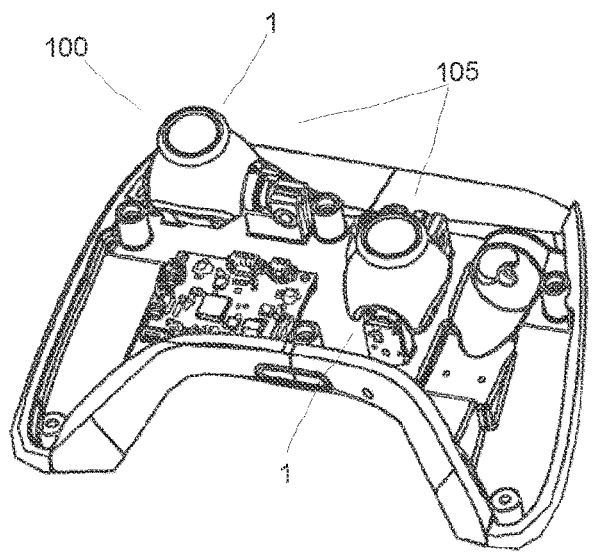

FIG. 8e shows a joystick 104 having a braking device 1 as a haptic operating apparatus 100. FIG. 8f shows a game pad 105 having the braking device 1 so as to provide haptic feedback to the player as a function of the game situation.

Figure 9A:
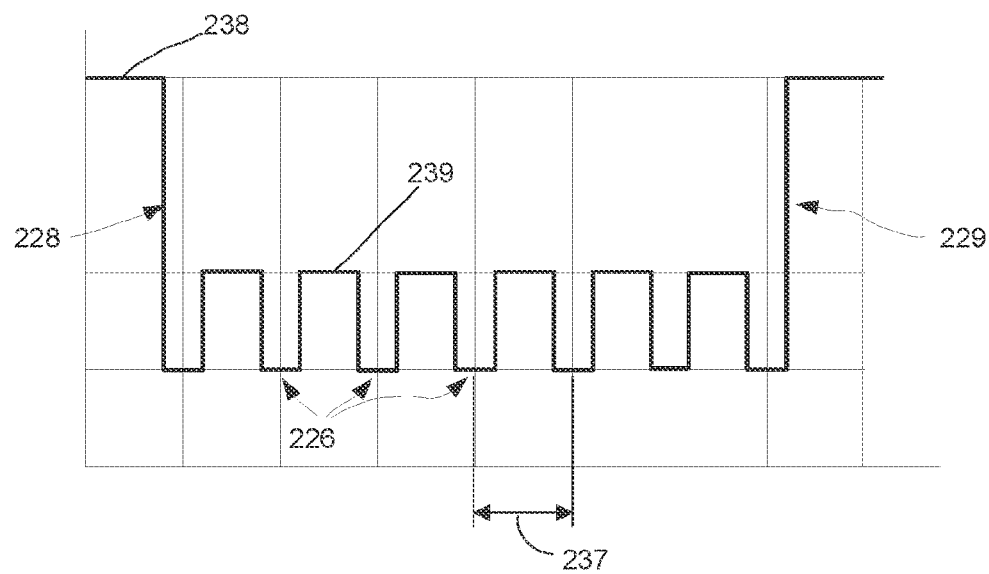
FIGS. 9a-9c show possible torque profiles over the rotation angle.
Figure 9B:
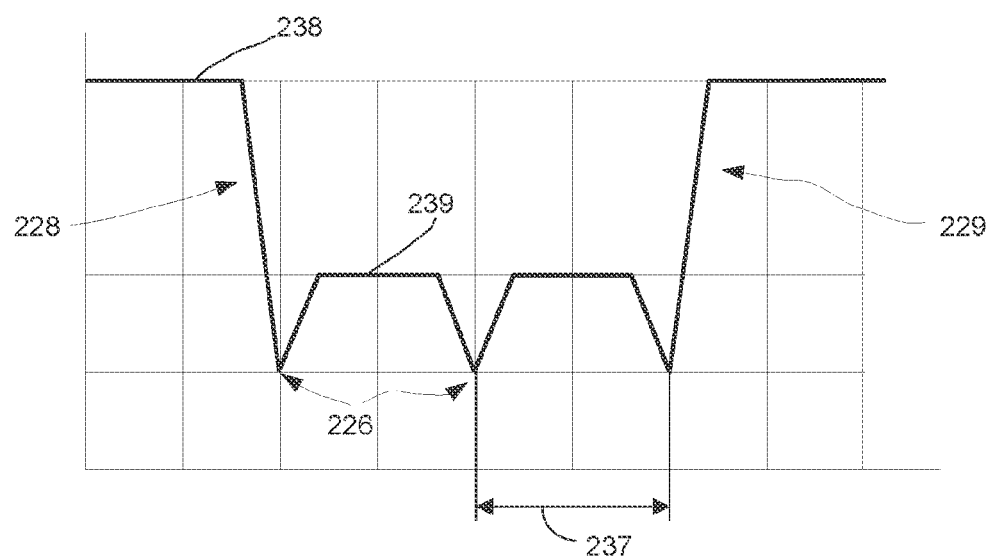
Figure 9C:
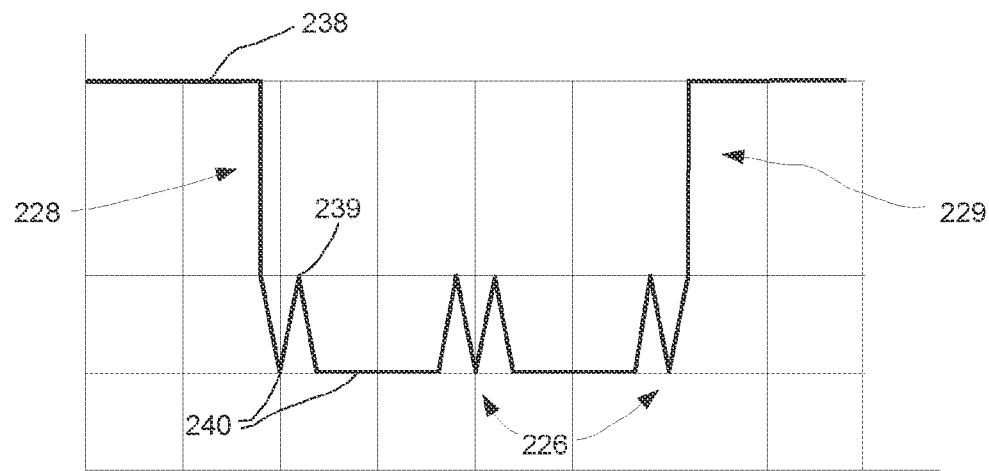

Possible variants of embodiment for controlling a dynamically generated magnetic field, or a dynamically generated braking moment, as a function of the rotation angle are illustrated in FIGS. 9a, 9b and 9c.

FIG. 9a here shows a variant in which the braking device 1 is used as a rotating button and a haptic operating aid. Illustrated is the rotational resistance over the rotation angle. A left terminal detent 228 and a right terminal detent 229 can be generated. As the rotating button is rotated onward, a high magnetic field, or detent moment 238, is generated there, as a result of which the rotating button puts up a high level of resistance in relation to a rotating movement. The user receives the haptic feedback of a terminal detent.

A ripple action of the rotating movement can take place, or be generated, here. For example, this can be used for navigating through a graphic menu and for selecting menu items. A first ripple point 226 here is provided directly next to the left terminal detent 228, said first ripple point 226 during operation corresponding to a first menu item, for example. If the next menu item is to be selected, the rotating button thus has to be rotated in a clockwise manner. To this end, the dynamically generated greater magnetic field, or ripple moment 239, or the frictional moment of the latter, has to be overcome before the next ripple point 226 is reached.

An angular spacing 237 between individual ripple points is dynamically variable and is adapted to the number of available ripple points or menu items.

FIG. 9b shows a variant in which the magnetic field does not abruptly increase toward the terminal detents 228, 229 but has a steep profile. Furthermore, ramp-type gradients of the magnetic field are provided in each case toward the two rotational sides at the ripple points 226, as a result of which the rotational resistance increases toward the corresponding rotation directions. Using the same operating apparatus 100, only three ripple points 226 are made available here, the angular spacing 237 of the latter being larger than in the example according to FIG. 9a.

FIG. 9c shows a variant in which a lower rotational resistance is present between individual ripple points 226, and an increased magnetic field 239 is in each case generated only directly adjacent to the ripple points 226 so as to enable rippling at the individual ripple points 226 and to simultaneously make available only a minor rotational resistance between individual ripple points.

In principle, a mix of the operating modes and the magnetic field profiles of FIGS. 9a, 9b and 9c is also possible. For example, in the case of different sub-menus, a correspondingly different adjustment of the magnetic field profile can take place.

In all cases it is also possible, for example in the event of a ripple, that switching no longer takes place between a lower and a higher amperage of identical polarity (thus, for example, +0.2 to +0.8 A=ripple) as to date, but takes place in an alternating manner with variable polarity, i.e. from +0.2 to +0.8 A and then for the next ripple by way of −0.2 A to −0.8 A, and then for the next moment peak from +0.2 to +0.8 A, etc.

The preferably low-alloy steel can keep a residual magnetic field. The steel is preferably demagnetized regularly or when required (inter alia by a special alternating field).

The material FeSi3P (silicon steel), or a material of a related type, is preferably used for the components passed through by the magnetic field.

In all cases, voice or noise control can be performed. The braking apparatus can be adaptively controlled using the voice control.

When the rotating unit is not being rotated, i.e. when the angle is constant, the current is preferably continuously reduced over time. The current can also be varied as a function of speed (rotational angular speed of the rotating unit).

| | List of Reference Signs: |
|---|---|
| 1 | Braking device |
| 2 | Axle unit |
| 3 | Rotating member |
| 4 | Braking apparatus |
| 5 | Sensor apparatus |
| 6 | Wedge bearing apparatus |
| 7 | Sealing apparatus |
| 8 | Wall |
| 9 | Shielding apparatus |
| 11 | Connector line |
| 12 | Bore |
| 13 | Receptacle space |
| 14 | Connection |
| 15 | Magnetic ring unit |
| 17 | Sealing unit |
| 19 | Shielding member |
| 22 | Bearing apparatus |
| 23 | Finger wheel |
| 24 | Coil unit |
| 25 | Magnetic field sensor |
| 27 | Sealing part |
| 29 | Separation unit |
| 33 | Additional part |
| 34 | Medium |
| 35 | Circuit board |
| 37 | Sealing part |
| 39 | Decoupling apparatus |
| 44 | Braking member |
| 45 | Signal line |
| 49 | Mounting apparatus |
| 50 | Console |
| 59 | Fastening apparatus |
| 100 | Operating apparatus |
| 101 | Operating head |
| 102 | Thumb wheel |
| 103 | Computer mouse |
| 104 | Joystick |
| 105 | Game pad |
| 106 | Mouse wheel |
| 190 | Shielding ring |

-continued

| | List of Reference Signs: |
|---|---|
| 226 | Ripple point |
| 228 | Terminal detent |
| 229 | Terminal detent |
| 237 | Angular spacing |
| 238 | Detent moment |
| 239 | Ripple moment |
| 240 | Base moment |
| 290 | Gap |
| 291 | Filler medium |
| 390 | Decoupling sleeve |
| 391 | Decoupling gap |
| 392 | Axial wall |
| 404 | Holder |
| 412 | Bearing point |
| 416 | Diameter |
| 418 | Bearing point |

The invention claimed is:

1. A magnetorheological braking device for braking rotational movements, the magnetorheological braking device comprising:
an axle unit and a rotating member rotatably mounted about said axle unit;
a magnetorheological braking apparatus configured to brake a rotatability of said rotating member in a targeted manner, said magnetorheological braking apparatus including a coil unit for generating a magnetic field;
a sensor apparatus for detecting a rotary position of said rotating member, said sensor apparatus having at least one magnetic ring unit and at least one magnetic field sensor for detecting a magnetic field of said magnetic ring unit;
a shielding apparatus for at least partially shielding said sensor apparatus from the magnetic field of said coil unit of said braking device;
said shielding apparatus having at least one shielding member, which, at least in portions, surrounds said magnetic ring unit, and at least one separation unit disposed between said shielding member and said magnetic ring unit and having a magnetic conductivity which is less by a multiple than a magnetic conductivity of said shielding member;
a mounting apparatus disposed to connect said shielding apparatus to said rotating member at least partially in a rotationally fixed manner; and
said shielding apparatus having at least one magnetic decoupling apparatus disposed between said shielding member and said rotating member, said decoupling apparatus having a magnetic conductivity which is less by a multiple than a magnetic conductivity of said shielding member, and said decoupling apparatus is at least in part provided by said mounting apparatus.

2. The magnetorheological braking device according to claim 1, wherein at least one of said rotating member or said shielding member is at least in part integrally connected to said mounting apparatus.

3. The magnetorheological braking device according to claim 1, wherein at least one of said rotating member or said shielding member or said separation unit is at least in part assembled on said mounting apparatus.

4. The magnetorheological braking device according to claim 1, wherein said mounting apparatus has at least one fastening apparatus for fastening at least one additional part.

5. The magnetorheological braking device according to claim 1, wherein a spacing distance is formed between said rotating member and said shielding member in said mounting apparatus, the spacing distance corresponding to at least one quarter or at least one half of a maximum diameter of an electric coil of said coil unit.

6. The magnetorheological braking device according to claim 1, wherein said shielding member is not disposed between said magnetic field sensor and said magnetic ring unit, to prevent said shielding member from shielding said magnetic field sensor from the magnetic field to be detected of said magnetic ring unit.

7. The magnetorheological braking device according to claim 1, wherein said shielding member at least in portions surrounds said magnetic ring unit at least on a radially external side, or wherein said shielding member at least in portions surrounds said magnetic ring unit on at least one axial side that faces said coil unit of said braking apparatus.

8. The magnetorheological braking device according to claim 1, wherein said shielding member is a shielding ring having an L-shaped or U-shaped cross section.

9. The magnetorheological braking device according to claim 1, wherein said separation unit has at least one gap running between said shielding member and said magnetic ring unit and a filler medium disposed in said gap.

10. The magnetorheological braking device according to claim 9, wherein said filler medium connects said magnetic ring unit in a rotationally fixed manner to said shielding member.

11. The magnetorheological braking device according to claim 1, wherein the magnetic ring unit, by way of at least one of said separation unit or said shielding member, is connected in a rotationally fixed manner to said decoupling apparatus, and wherein said decoupling apparatus is connected in a rotationally fixed manner to said rotating member.

12. The magnetorheological braking device according to claim 1, wherein said decoupling apparatus comprises a decoupling sleeve which radially surrounds said axle unit and at least in portions is disposed axially adjacent said rotating member.

13. The magnetorheological braking device according to claim 12, wherein the decoupling sleeve is axially spaced apart from said rotating member by way of a decoupling gap.

14. The magnetorheological braking device according to claim 12, wherein said decoupling sleeve at least in portions is configured as a separate component or at least in portions is provided by at least one additional part, and said decoupling sleeve thereby radially surrounds said rotating member and is integrally connected with said additional part.

15. The magnetorheological braking device according to claim 12, further comprising a sealing apparatus fastened to said the decoupling sleeve of said mounting apparatus, wherein said sealing apparatus seals against said rotating member, or against an additional part that radially surrounds said rotating member, or against said axle unit so as to counteract any leakage of a magnetorheological medium of said braking device which is disposed in a receptacle space.

16. The magnetorheological braking device according to claim 12, wherein said decoupling sleeve has an axial wall that extends between said braking apparatus and said magnetic ring unit, and wherein at least part of said sealing apparatus or at least one bearing apparatus for a rotating movement of said rotating member relative to said axle unit is fastened to said axial wall.

17. The magnetorheological braking device according to claim 12, wherein said decoupling sleeve is made from plastics material.

18. The magnetorheological braking device according to claim 1, wherein said rotating member, at an axial end thereof that faces towards said magnetic ring unit, does not protrude beyond a last axial braking member of said braking apparatus by more than one half an axial width of a braking member.

19. The magnetorheological braking device according to claim 1, further comprising an additional part radially surrounding said rotating member, and wherein said rotating member, at an axial end of said axle unit on which said magnetic ring unit is disposed, is axially offset rearward in relation to said additional part.

20. The magnetorheological braking device according to claim 1, wherein said shielding member has a relative magnetic permeability of at least 1000 or at least a relative magnetic permeability of said rotating member.

21. The magnetorheological braking device according to claim 1, wherein said shielding member comprises a nickel/iron alloy with 60% to 90% nickel and proportions of one or more materials selected from the group consisting of copper, molybdenum, cobalt, and chromium.

22. The magnetorheological braking device according to claim 1, wherein at least one of said decoupling apparatus, said separation unit, or at least one additional part that radially surrounds said rotating member has a relative magnetic permeability of at most 1000 or has a relative magnetic permeability of no more than one thousandth of a relative magnetic permeability of said shielding member.

23. The magnetorheological braking device according to claim 1, wherein said sensor apparatus is configured to detect, in addition to the rotary position of said rotating member, at least one axial position of said rotating member relative to said axle unit.

24. The magnetorheological braking device according to claim 1, wherein said magnetic ring unit annularly surrounds said magnetic field sensor at least in portions, and wherein said magnetic field sensor is disposed with an axial offset from an axial center of said magnetic ring unit.

25. The magnetorheological braking device according to claim 1, wherein said sensor apparatus is configured to determine from an intensity, detected by said magnetic field sensor, of the magnetic field of said magnetic ring unit an axial position of said rotating member relative to said axle unit, and to determine from an algebraic sign of a variation of the intensity of the magnetic field of said magnetic ring unit an axial direction of movement of said rotating member relative to said axle unit.

26. The magnetorheological braking device according to claim 1, wherein said rotating member and said axle unit define a closed chamber therebetween, wherein said rotating member at a first end of said closed chamber is rotatably received on said axle unit, and wherein said closed chamber is substantially filled with a magnetorheological medium.

* * * * *